US012190755B2

(12) United States Patent
Sharp

(10) Patent No.: US 12,190,755 B2
(45) Date of Patent: Jan. 7, 2025

(54) VISUAL DISPLAY SYSTEM

(71) Applicant: Airflow Kinetics, LLC, Newton, MA (US)

(72) Inventor: Gordon Sharp, Newton, MA (US)

(73) Assignee: Airflow Kinetics, LLC, Newton, MA (US)

( * ) Notice: Subject to any disclaimer, the term of this patent is extended or adjusted under 35 U.S.C. 154(b) by 116 days.

(21) Appl. No.: 17/875,272

(22) Filed: Jul. 27, 2022

(65) Prior Publication Data

US 2024/0038104 A1 Feb. 1, 2024

(51) Int. Cl.

| | |
|---|---|
| ***G09F 13/22*** | (2006.01) |
| ***F04D 19/00*** | (2006.01) |
| ***F04D 25/16*** | (2006.01) |
| ***F04D 27/00*** | (2006.01) |
| ***G09F 13/34*** | (2006.01) |
| ***G09F 19/12*** | (2006.01) |
| ***G09F 27/00*** | (2006.01) |

(52) U.S. Cl.

CPC ......... *G09F 19/125* (2021.05); *F04D 19/002* (2013.01); *F04D 25/166* (2013.01); *F04D 27/002* (2013.01); *G09F 13/22* (2013.01); *G09F 13/34* (2013.01); *G09F 27/00* (2013.01)

(58) Field of Classification Search

CPC ........ G09F 19/125; G09F 13/22; G09F 13/34; G09F 27/00; F04D 19/002; F04D 25/166; F04D 27/002

See application file for complete search history.

(56) References Cited

U.S. PATENT DOCUMENTS 4,215,500 A * 8/1980 Sharp ...................... G09F 19/02 40/409
5,291,674 A * 3/1994 Torrence ................. G09F 19/02 40/410
5,502,908 A 4/1996 Powell et al.
5,509,908 A * 4/1996 Hillstead ........... A61M 25/0662 604/164.1
5,794,364 A 8/1998 Richmond (Continued)

FOREIGN PATENT DOCUMENTS

WO 2024/025696 A1 2/2024

OTHER PUBLICATIONS

International Search Report from International Application No. PCT/US2023/026491, date mailed: Sep. 28, 2023.

*Primary Examiner* — Gary C Hoge

(74) *Attorney, Agent, or Firm* — Morse, Barnes-Brown & Pendleton, P.C.; Sean D. Detweiler, Esq.

(57) ABSTRACT

A visual display system creates various visual and audible effects from the motion of light particulate matter, such as beads. The system makes use of a variable flow air array generation device that facilitates a variable flow air array within the chamber. The device includes three or more array sections and a controller. The array sections each contribute distinct but coordinated air flows that coalesce with each other into forming the variable flow air array within the chamber. The controller controls each of the array sections. The variable flow air array generated by the device agitates, fluidizes, suspends, or floats at least some of a plurality of beads in the chamber creating a dynamic display of beads within the chamber.

35 Claims, 21 Drawing Sheets

(56) References Cited

U.S. PATENT DOCUMENTS

| | | | | |
|---|---|---|---|---|
| 6,089,348 | A * | 7/2000 | Bokor | F01N 1/003 181/255 |
| 6,502,337 | B1 * | 1/2003 | Ochi | G09F 19/02 40/406 |
| 6,550,169 | B1 | 4/2003 | Sena et al. | |
| 7,302,767 | B2 * | 12/2007 | Mcknight | B44C 5/00 40/454 |
| 7,963,057 | B1 | 6/2011 | Ruiz | |
| 8,347,534 | B2 | 1/2013 | Ruiz | |
| 11,017,697 | B2 | 5/2021 | Sharp | |
| 2003/0089008 | A1 * | 5/2003 | Ootsuta | G09F 19/02 40/439 |
| 2014/0086729 | A1 * | 3/2014 | Peery | F04D 29/052 415/119 |
| 2021/0065592 | A1 * | 3/2021 | Sharp | G09F 27/00 |

* cited by examiner

VISUAL DISPLAY SYSTEM

FIELD OF THE INVENTION

The present invention relates to the field of kinetic art and visual effect display devices and systems used for home or commercial art installations. More specifically, the invention relates to the control of the movement of light particulate matter, such as expanded polystyrene beads or spheres, from one area of a visual display system to another area of the visual display device using a variable flow air array.

BACKGROUND

A prior patented invention described in U.S. Pat. No. 11,017,697 to Sharp is an improvement on in U.S. Pat. No. 4,215,500 also to Sharp, both of which are incorporated herein by reference. These patents disclose visual display devices that use the principle of a fluidized bed to create interesting visual and audible effects from the motion of beads of expanded polystyrene or similar materials in a stream of flowing air. The '500 patent involves fluidization of the beads in only one column, while the '697 patent introduces a conduit or second column to move beads from one area of the column to another and to dynamically or automatically vary the number of beads in the column.

U.S. Pat. No. 7,302,767 to McKnight provides only one source of airflow that is moving the beads. Beads at the bottom of the display device also move from the outer column to the inner column by the Venturi effect. However, the venturi effect for moving beads is only effective over a short relative distance and fails to disclose multiple independent controllable sources of airflow that combine to form a variable flow air array.

U.S. Pat. No. 7,963,057 B1 and U.S. Pat. No. 8,347,534 B2 both awarded to Ruiz, like McKnight, use a Venturi effect to pull beads from a horizontal collection platform into the bead discharge nozzle so they can be propelled into the air. Similar to McKnight, there are no multiple independently controlled airflows that combine to form a variable flow air array.

U.S. Pat. No. 6,550,169 B1 to Sena provides a novelty display with a fan wherein beads move by gravity and the fan's suction force into the inlet of the fan. The fan then blows them up into and through a tube where they fall back into the viewable portion of the display unit. This patent again only discloses one means of moving the beads through the unit, in this case by a fan. The flow of the beads into this fan is partially through gravity from a sloping ramp. Once the beads are close enough to the fan inlet the fan's suction force will pull them into the fan itself. There is nothing disclosed to slow or stop the movement of beads or their flowrate into the fan to control the number of beads on the ramp or at the bottom of the unit. There is no means disclosed to independently control or at least provide some partially independent control of the number of beads in one area of the display unit. Also, the means disclosed to move the beads through the unit involves running the beads through the fan itself. For a unit that may run for long periods of time, this has a significant disadvantage since the fan blades and the interaction of the blades spinning in a housing over time will damage and or crush the beads. Although this may or may not happen often, over time the number of beads that become damaged and or crushed by the mechanical movement of the blades in the housing will cumulatively become a large number affecting and degrading the overall appearance of the visual display. As such maintenance may be required on a frequent basis to replace the damaged beads which may be difficult, expensive, and time consuming particularly on a larger unit.

U.S. Pat. No. 5,794,364 awarded to Richmond, provides a means of launching spherical projectiles such as balloons from a vertical chute. These round projectiles fall back to a sloping, concave surface and roll back to the vertical chute where they are launched repeatedly. Like Sena, a sloping surface and gravity are the primary means for moving objects of the invention to an upward-moving airstream. Again, as in Sena and other references, there are no multiple independently controlled airflows that combine to form a variable flow air array.

SUMMARY

There is a need for a display device or system for creating various visual and audible effects with a plurality of beads that is capable of providing a variable flow air array made up of multiple distinct but coordinated air flows that coalesce with each other into forming the variable flow air array within a chamber of the system to agitate, fluidize, suspend, or float at least some of the plurality of beads creating a dynamic display of beads within the chamber. The present invention is capable of controllable effects such as controllable fountain-like spouts of various sizes, numbers, and intensities of behavior; upside-down waterfalls; more precise spatial control and balancing of the fluidized bed behaviors; and creation of various sizes and intensities of fire and flame-like effects that can be made to appear or disappear in various locations under programmable control, etc. The present invention is directed toward further solutions to address this need, in addition to having other desirable characteristics.

In accordance with embodiments of the present invention, a visual display system is provided. The visual display system includes a chamber and a variable flow air array generation device.

The chamber has a bottom having a screened opening therethrough, a top opposite the bottom; and at least one sidewall extending between the bottom and the top and defining an interior volume. The at least one sidewall has an observation portion providing an internal view of the chamber from an environment external to the chamber. The plurality of beads are disposed within the interior volume of the chamber.

The variable flow air array generation device facilitates a variable flow air array. The device is in fluid communication with the screened opening in the bottom of the chamber. The variable flow air array generation device includes three or more array sections and a controller. The three or more array sections each contribute distinct but coordinated air flows within the chamber that coalesce with each other into forming the variable flow air array. The three or more array sections have a total combined area that is a substantial portion of a total area of the bottom having the screened opening therethrough. The controller is in electronic communication with and controls each of the three or more array sections of the device providing each of the distinct but coordinated air flows. The variable flow air array generated by the device agitates, fluidizes, suspends, or floats at least some of the plurality of beads creating a dynamic display of beads within the chamber.

In accordance with aspects of the present invention, the visual display system further includes a bead transport control subsystem. The bead transport control subsystem includes at least one conduit connecting a first region of the chamber with a second region of the chamber and having a screened opening disposed in a wall or end of the conduit. At least a portion of the plurality of beads can be controlled by an additional airflow passing through the at least one conduit via the screened opening. The additional airflow is controlled at least partially independently from the variable flow air array.

BRIEF DESCRIPTION OF THE FIGURES

These and other characteristics of the present invention will be more fully understood by reference to the following detailed description in conjunction with the attached drawings described below.

DETAILED DESCRIPTION

Figure 1:
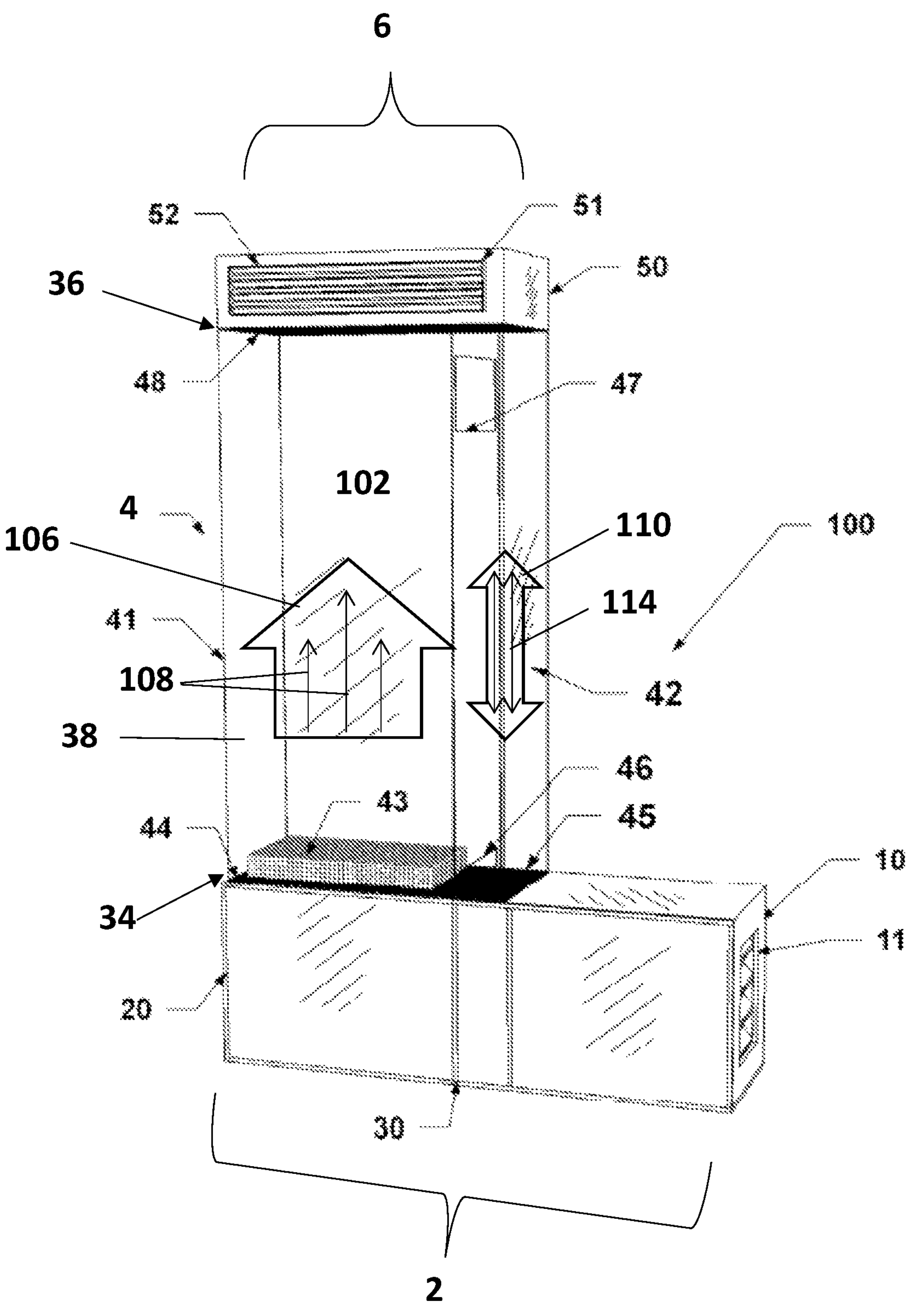
FIG. 1 is an overview drawing of the visual display system using a large fan source and dampers as the variable flow air array sections.
Figure 2:
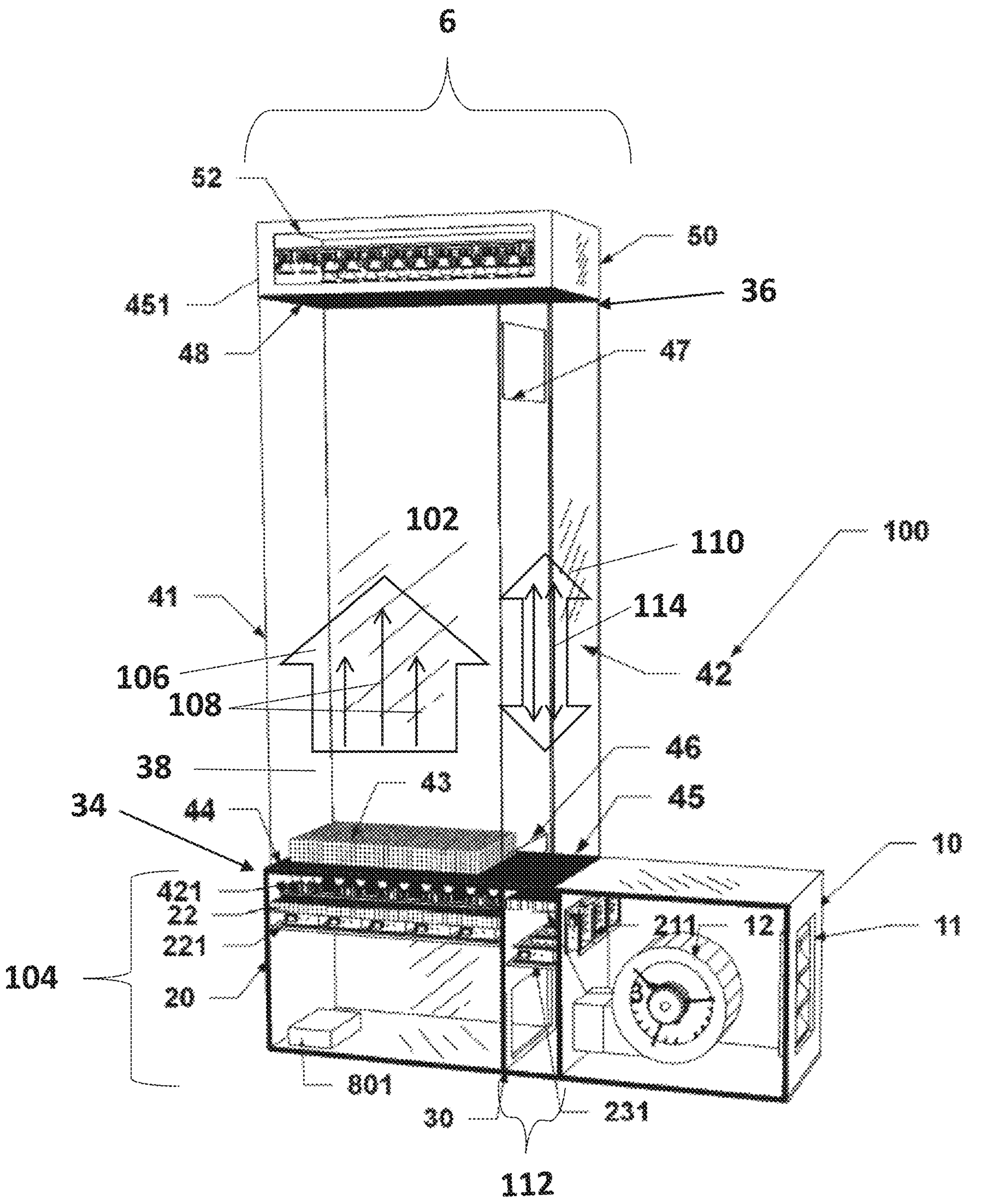
FIG. 2 is a sectional view of the visual display system shown in FIG. 1.
Figure 3:
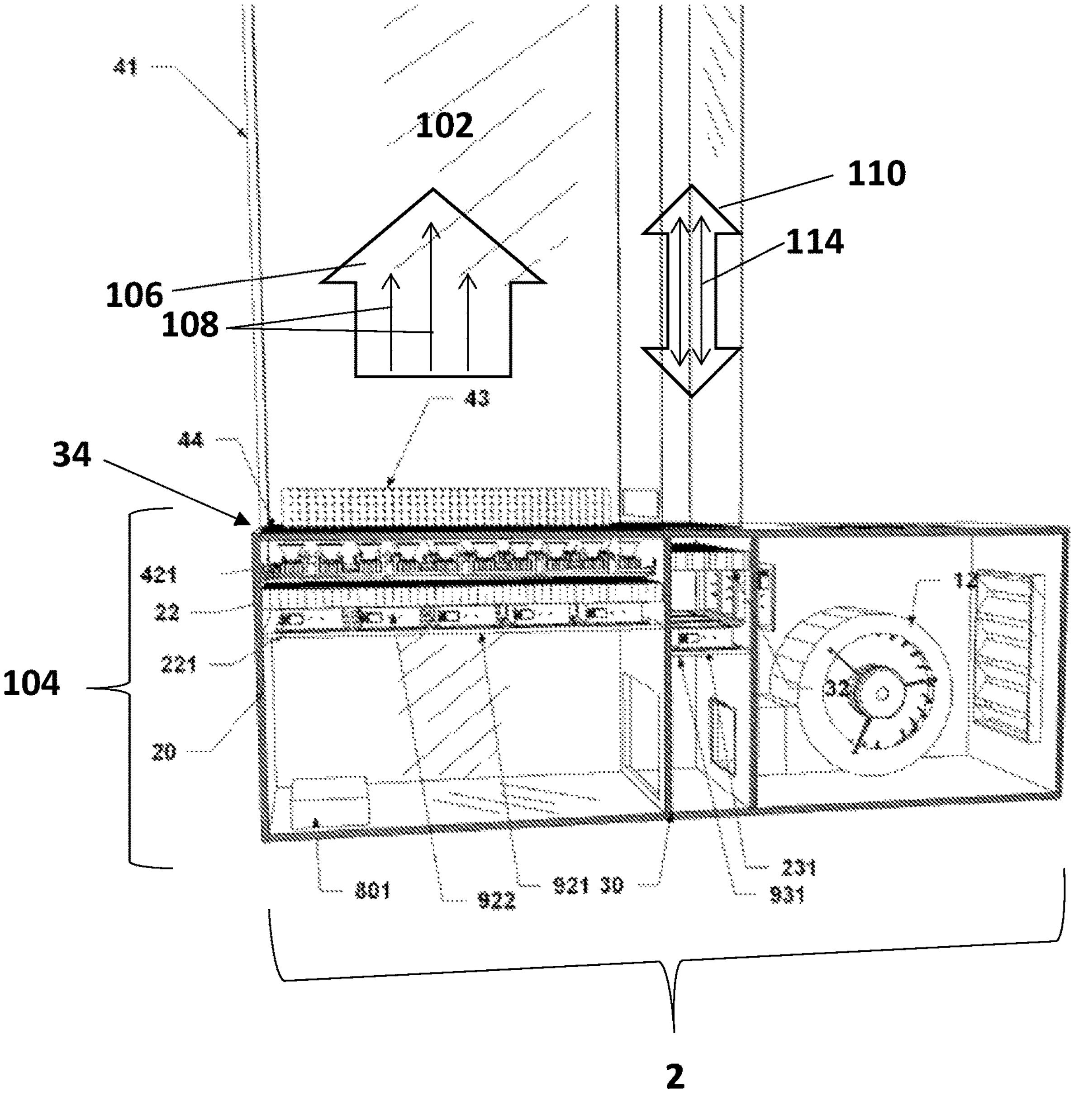
FIG. 3 is a closeup sectional view of the base of the visual display system shown in FIG. 1.
Figure 4:
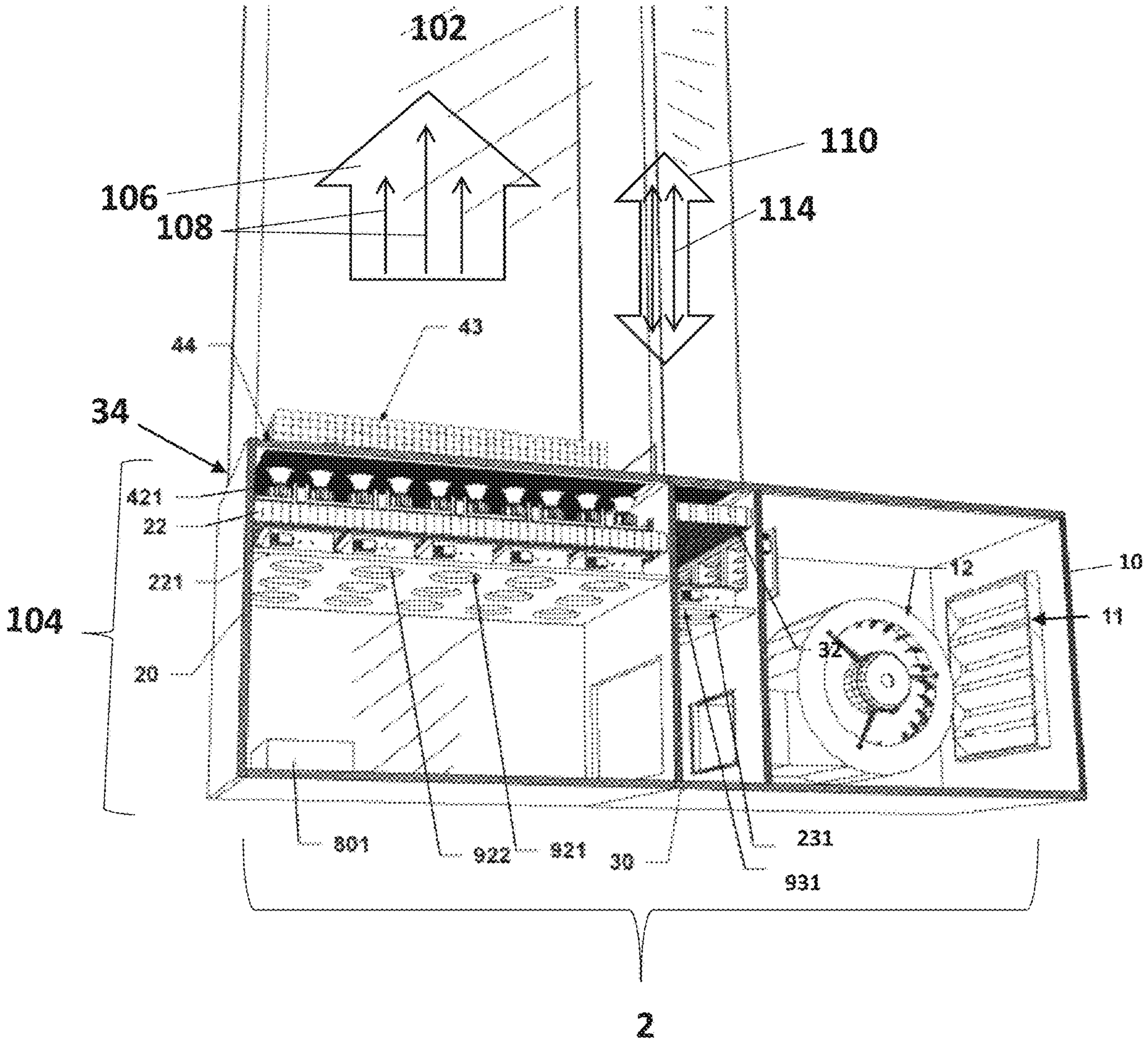
FIG. 4 is a closeup sectional bottom view of the base of the visual display system shown in FIG. 1.
Figure 5:
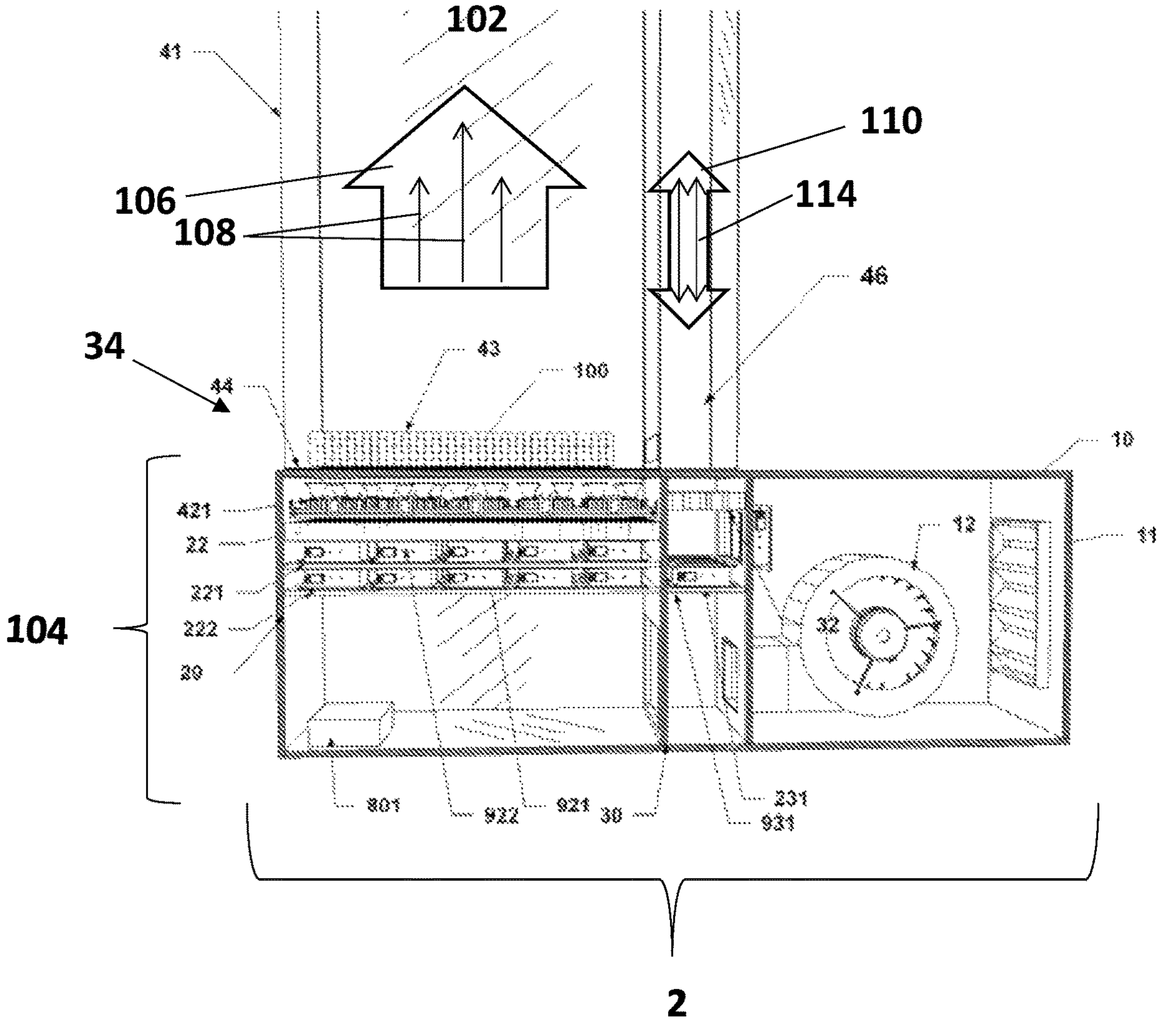
FIG. 5 is a closeup sectional view of the base of the visual display system using one large fan as the airflow source and multiple dampers as the variable flow air array sections with the larger main column variable flow air array generation device composed of two dampers in series.

An illustrative embodiment of the present invention relates to a visual display system creating various visual and audible effects from the motion of light particulate matter, such as beads of expanded polystyrene, comprising a chamber through which variable flows of air are configured to agitate, fluidize, suspend, or float at least some of the beads. The system makes use of a novel variable flow air array generation device that facilitates a variable flow air array within the chamber. The device includes three or more array sections and a controller. The three or more array sections each contribute distinct but coordinated air flows that coalesce with each other into forming the variable flow air array within the chamber. The three or more array sections also have a total combined area that is a substantial portion of a total area of the screened area at the bottom of the chamber through which the variable flow air array passes. The controller controls each of the three or more array sections of the device providing each of the distinct but coordinated air flows. The variable flow air array generated by the device agitates, fluidizes, suspends, or floats at least some of a plurality of beads in the chamber creating a dynamic display of beads within the chamber.

FIG. 1 through FIG. 21 wherein like parts are designated by like reference numerals throughout, illustrate an example embodiment or embodiments of a visual display system, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, or type of elements or materials, in a manner still in keeping with the spirit and scope of the present invention.

The visual display system 100 includes a base assembly 2, a chamber assembly 4, and a top assembly 6. The base assembly 2 includes a chamber base 20 and in certain embodiments, such as shown in FIG. 1, a fan base 10, and a conduit base 30. The base assembly 2 may be constructed of any suitable solid material such as for example wood, plastic, or metal. The chamber assembly 4 includes a chamber 41, and in certain embodiments, such as shown in FIG. 1, a conduit 42. The top assembly 6 includes a top cap 50. The top assembly 6 may be constructed of any suitable solid material such as for example wood, plastic, or metal. In some embodiments, such as shown in FIG. 1, the top cap may further include an exhaust port 52 controlled, at least partially, by a damper 51.

The chamber 41 of the chamber assembly 4 has a bottom 34 where it attaches to the chamber base 20 of the base assembly 2, a top 36 where it attached to the top cap 50 of the top assembly 6, and at least one sidewall 38 extending between the top 36 and bottom 34 and defining an interior volume 102 of the chamber 41. The bottom 34 has a screened opening 44 therethrough. The screened opening 44 can be made of any suitable material such as plastic or metal that can pass air without letting out the particle material or beads 43 contained in the chamber 41. Typically, this screening material will have a hole diameter or opening that is smaller than the diameter of the smallest beads 43 being used in the visual display system 100. The at least one sidewall 38 has an observation portion providing an internal view of the chamber 41 from an environment external to the chamber 41. In certain embodiments, the observation portion of the at least one sidewall 38 comprises a substantially transparent or substantially translucent material such as glass, plexiglass, or polycarbonate.

A plurality of beads 43 is disposed within the interior volume of the chamber 41. In certain embodiments, the plurality of beads 43 comprise lightweight expanded polystyrene plastic beads. Beads 43 can be any relatively lightweight, small material with a density of less than about 1 gram/centimeter$^3$ (gm/cm$^3$) and preferably of spheroid shape. In some embodiments, common expanded polystyrene (EPS) beads such as those used in "bean bag" chairs having a size between 2 and 5 millimeters with a density of about 0.016 to 0.022 gm/cm$^3$. However, for very large displays a larger expanded polystyrene bead size such as up to about 13 mm or larger may be preferred.

The visual display system 100 further includes a variable flow air array generation device 104 that facilitates a variable flow air array 106. The variable flow air array 106 generated by the device 104 agitates, fluidizes, suspends, or floats at least some of the plurality of beads 43 creating a dynamic display of beads 43 within the chamber 41. Here the variable flow air array generation device 104 is housed in the chamber base 20 of the base assembly 2. The device 104 is in fluid communication with the screened opening 44 in the bottom 34 of the chamber 41. The device 104 comprises three or more array sections and a controller 801.

Each of the three or more array sections contributes distinct but coordinated air flows 108 within the chamber 41 that coalesce with each other into forming the variable flow air array 106. The three or more array sections have a total combined area that is a substantial portion of a total area of the bottom 34 having the screened opening 44 therethrough. In certain embodiments, the three or more array sections have a total combined area that is at least 40% of a total area of the bottom 34 having the screened opening 44 therethrough. In some embodiments, the three or more array sections of the variable flow air array generation device 104 are substantially contiguous. In other embodiments, the three or more array sections of the variable flow air array generation device 104 are arranged in a grid, one-dimensional array, multiple spaced one-dimensional arrays, or ring-shaped configuration. Examples of such configurations can be seen in FIG. 20 and FIG. 21.

The controller 801 in electronic communication with and controls each of the three or more array sections of the device 104 providing each of the distinct but coordinated air flows 108. In certain embodiments, the controller 801 of the variable flow air array generation device 104 comprises an analog controller, a processor, or a microcontroller. In some embodiments, the controller 801 of the variable flow air array generation device 104 provides variable signals to each of the three or more array sections individually. The control can be provided via DMX 512 type digital controls or through any analog, digital, networked, software, microprocessor driven, or other methods known to those skilled in the art of controlling airflows with HVAC and industrial controls.

In some embodiments, the system 100 further includes a bead transport control subsystem similar to what is disclosed in U.S. Pat. No. 11,017,697 to Sharp comprising at least one conduit 42 connecting a first region of the chamber 41 with a second region of the chamber 41 and having a screened opening 45 disposed in a wall or end or end of the conduit 42. The conduit 42 may also have one or more screened exhaust openings in the sidewalls as shown in U.S. Pat. No. 11,017,697. In this example, at least one conduit 42 connects to a first region of the chamber 41 via a bottom opening 46 and with a second region of the chamber 41 via a top opening 47. This bead transport system allows at least a portion of the plurality of beads 43 to be controlled by passing an additional airflow 110, 114 through the at least one conduit 42 via the screened opening 45. The additional airflow 110, 114 is controlled at least partially independently from the variable flow air array 106.

In some such embodiments, the bead transport system further comprises a second variable flow air array generation device 112 that facilitates a variable flow air array 110, the second variable flow air array generation device 112 in fluid communication with the screened opening 45 in the conduit 42. The device 112 comprises multiple array sections contributing distinct but coordinated air flows 114 within the conduit 42 that coalesce with each other into a variable flow air array 110.

In certain embodiments, the three or more array sections of the variable flow air array generation device 104 comprise a damper system 221 wherein each of the one or more sections is a damper 922. An example of this can be seen in FIGS. 2-5. Here the embodiments that make use of a central air source such as one more controllable bottom fans 12. In this example, a bottom fan 12 is housed in the fan base 10. The fan base 10 can include a damper 11 to help control airflow into the base assembly 2 and into the chamber 42 as well as to help control the amount of negative pressure in fan base 10 versus the ambient air outside the base assembly 2. Damper 11 can be implemented in many different ways known to those skilled in the art to create a controllable airflow obstruction between the inside and outside of the box to create a pressure drop from the outside of the box to the inlet of fan 12. Fan 12 is shown as a centrifugal blower; however, any type of blower or fan can be used here such as propeller, axial, mixed flow, inline, computer cooling fan, etc. Although this fan 12 could be a fixed-speed fan, it would be advantageous that this fan as well as any other fan used in the preferred embodiments also has the capability to vary its speed. Many different mechanical and electronic approaches are well known by those skilled in the art to vary the speed of any fan used in an embodiment of this invention. For example, an inline centrifugal blower could be used with an electronically commutated DC motor that is controlled with its variable speed controller thorough, e.g., a 0 to 10 Volt analog or digital control signal.

Fan 12 discharges into and feeds the chamber base 20 (in this case through column base 30). The three or more array sections of the variable flow air array generation device 104, in this example damper system 221, are disposed between the bottom fan 12 and the screened opening 44 of the bottom of the chamber 41. In this example, each of the individual dampers 922 are mounted in an array on a mounting plate 921 below the screened opening 44 to form the damper system 221 such the discharge from the fan 12 passes through the individual dampers 922 of system 221 creating distinct but coordinated air flows 108 within the chamber 41 that coalesce with each other into forming the variable flow air array 106.

In certain embodiments, the controllable damper system 221 comprises a second damper system 222. An example of this can be seen in FIG. 5. Here the second damper system 222 comprises multiple individual controllable dampers 922 mounted to the opposite side of the mounting plate 921 such that each damper 922 of the second damper system 222 is in fluid communication with a damper 922 of the first damper system 221. In such cases, one of the dampers 922 in series operates as a fast on/off mechanism while the other damper 922 at least partially controls the quantity, rate and/or direction of airflow. Each damper 922 can be controlled individually by the controller 801.

In certain embodiments, the system 100 further comprises a honeycomb airflow straightener 22 or fine mesh screen disposed between and in fluid communication with the screened opening 44 of the bottom 34 of the chamber 41 and one or more of the three or more array sections (damper system 221 in FIGS. 2-5) of the variable flow air array generation device 104.

In certain embodiments, the visual display system 100 further comprises one or more light sources 421, 451. Here, light sources 421 are disposed between the screened opening 44 of the bottom 34 of the chamber 41 and the one or more of the three or more array sections of the variable flow air array generation device 104 to shine up into the chamber 41 to illuminate the underside of the chamber 41. In some such embodiments, at least one of the one or more light sources 421 is disposed in at least one of the three or more array sections. Light sources 451 are disposed in the top cap 50 so as to shine down into the chamber 41 and illuminate the chamber 41 from the top. These lights can be of any type, but LED lights whose color and intensity can be controlled by the controller 801 either manually or digitally through DMX 512 type or other types of electronic control systems and programmed to run with a preset routine or interactively are preferred.

In embodiments where the visual display system 100 further includes a bead transport control subsystem, this system can also include one or more dampers 211, 231, 232 configured to vary at least a volume of the additional airflow to fluidize or cause the plurality of beads 43 to move through the at least one conduit 42. In the embodiments of FIGS. 2-5 the bead transport control subsystem further comprises an airflow control device configured to control the additional airflow into or out of the at least one conduit 42 through the screened opening 45. The airflow control device comprises a first damper system 231 mounted to mounting plate 931 and a second damper system 211. The first damper system 231 has a first end connected to an at least partially enclosed space of the conduit base 30 and also connected to one or more bottom fans 12 wherein a second end of the first damper system 231 is configured to blow at least a portion of outlet airflow of the one or more bottom fans 12 into the at least one conduit 42 through the screened opening 45 as the additional airflow 110. The second damper 211 has a first end connected to a second at least partially enclosed space of the fan base 10 and also connected to an inlet of the one or more bottom fan 12 wherein a second end of the second damper 211 is configured to pull the additional airflow 110 out of the at least one conduit 42 through the screened opening 45 into the inlet of the one or more bottom fan 12.

In some such embodiments, further including a bead transport control subsystem, such as seen in FIG. 2-5 the bead transport system may also include a honeycomb airflow straightener 32 or fine mesh screen disposed between and in fluid communication with the screened opening 45 of the conduit 42 and the multiple array sections of the second variable flow air array generation device 112 (damper system 231 in FIGS. 2-5) of the variable flow air array generation device 104.

Figure 6:
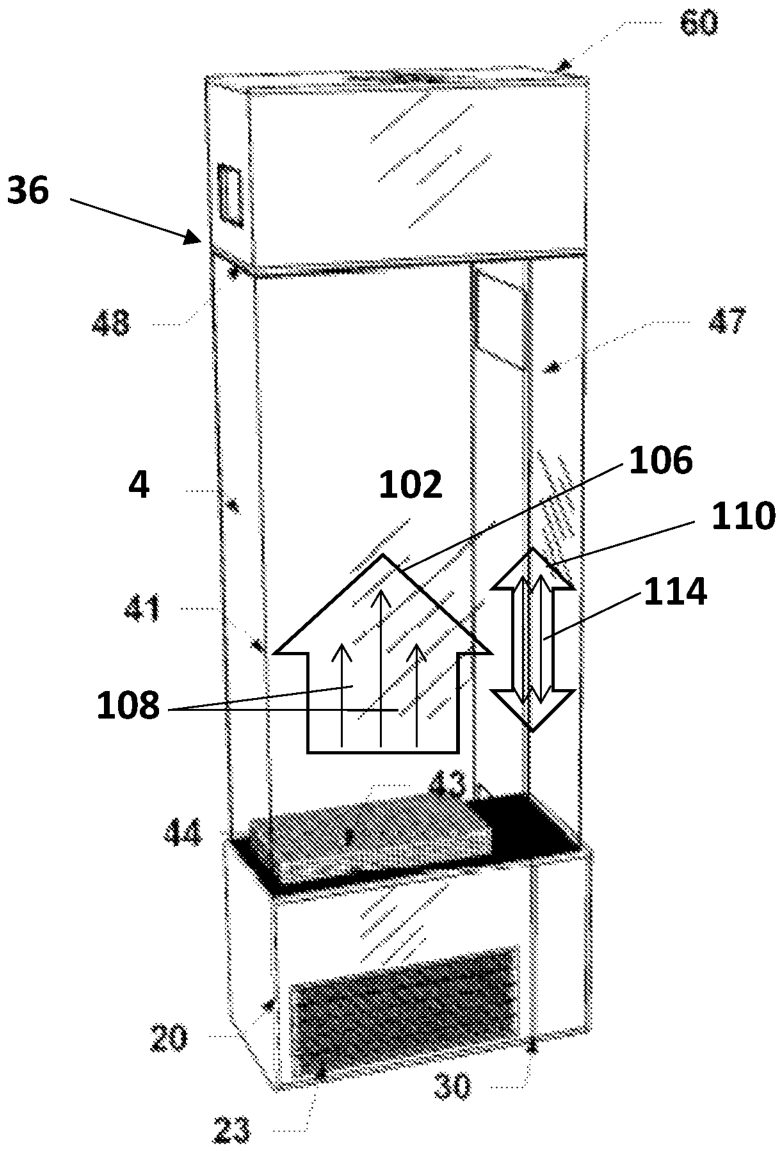
FIG. 6. is an overview drawing of the visual display system using a large fan source located in the top of the visual display system drawing air up through the main and side columns with dampers as the variable flow air array generation device.
Figure 7:
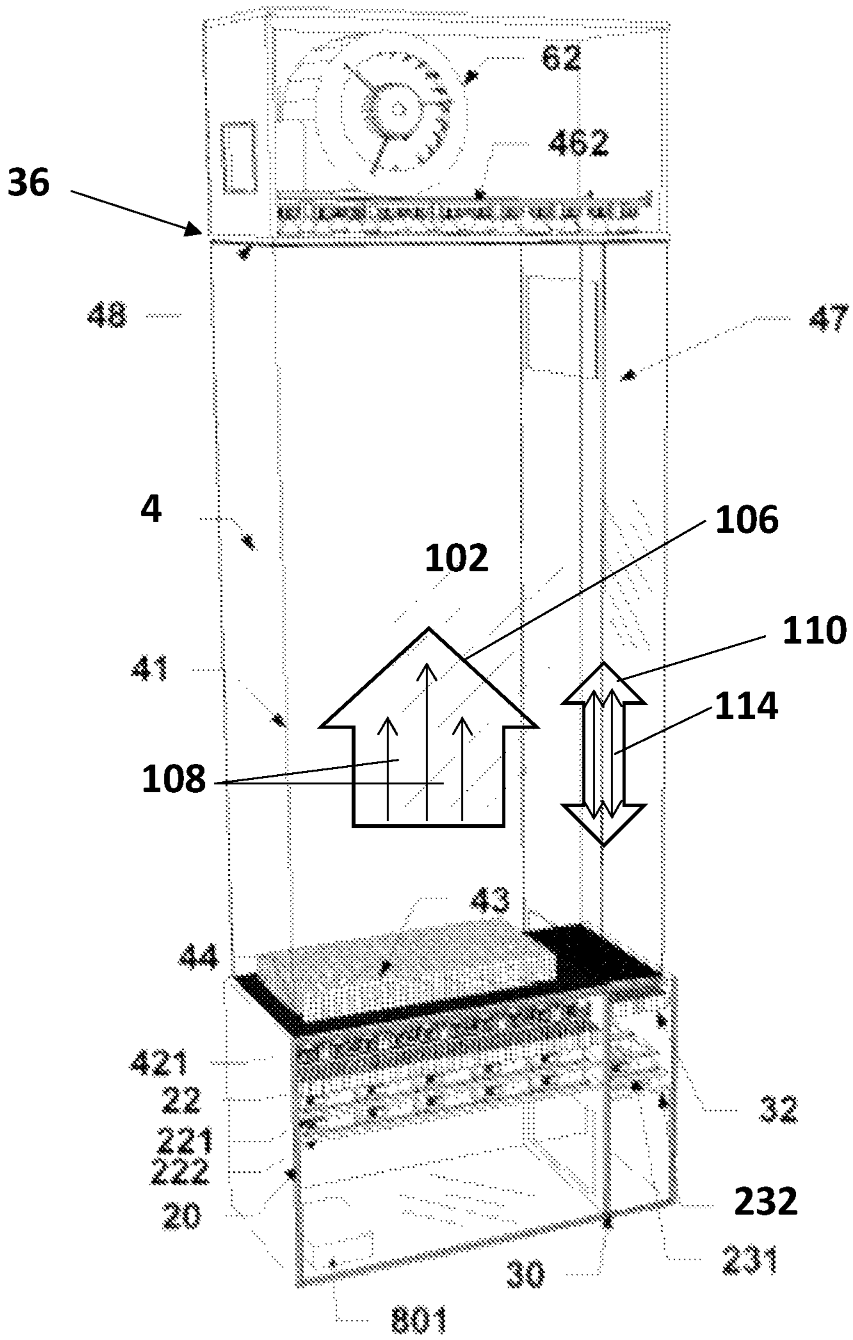
FIG. 7 is an overview sectional drawing of the visual display system shown in FIG. 6.

FIG. 6 and FIG. 7 depict an embodiment utilizing one or more controllable top fans 62. Here the top 36 of the chamber 41 comprises a screened opening 48 and a controllable top fan 62 disposed in a top fan cap 60 in fluid communication with the screened opening 48 configured to draw airflow through the interior volume of the chamber 41 and out through a screened opening 48 of the top 36. Fan 62 is shown as a centrifugal blower; however, any type of blower or fan can be used here such as propeller, axial, mixed flow, inline, computer cooling fan, etc. Although this fan 62 could be a fixed-speed fan, it would be advantageous that this fan as well as any other fan used in the preferred embodiments also has the capability to vary its speed. Many different mechanical and electronic approaches are well known by those skilled in the art to vary the speed of any fan used in an embodiment of this invention. For example, an inline centrifugal blower could be used with an electronically commutated DC motor that is controlled with its variable speed controller thorough, e.g., a 0 to 10 Volt analog or digital control signal. It should be apparent to one skilled in the art that a top fan 62 could also be used in conjunction with a bottom fan 12 or another airflow mechanism.

In certain embodiments, the top fan cap 60 further includes light sources 462 disposed in the top fan cap 60 so as to shine down into the chamber 41 and illuminate the chamber 41 from the top. The lights are arranged so as to not impede airflow. These lights can be of any type, but LED lights whose color and intensity can be controlled by the controller 801 either manually or digitally through DMX 512 type or other types of electronic control systems and programmed to run with a preset routine or interactively are preferred.

In some versions of this embodiment including a bead transport control subsystem that uses a damper system 231, the controllable damper system 231 comprises a second damper system 232. An example of this can be seen in FIG. 7. Here the second damper system 232 comprises multiple individual controllable dampers mounted to the opposite side of the mounting plate 931 such that each damper of the second damper system 232 is in fluid communication with a damper of the first damper system 231. In such cases, one of the dampers in series operates as a fast on/off mechanism while the other damper controls at least partially the quantity, rate, and/or direction of airflow. Each damper of damper can be controlled individually by the controller 801.

Figure 8:
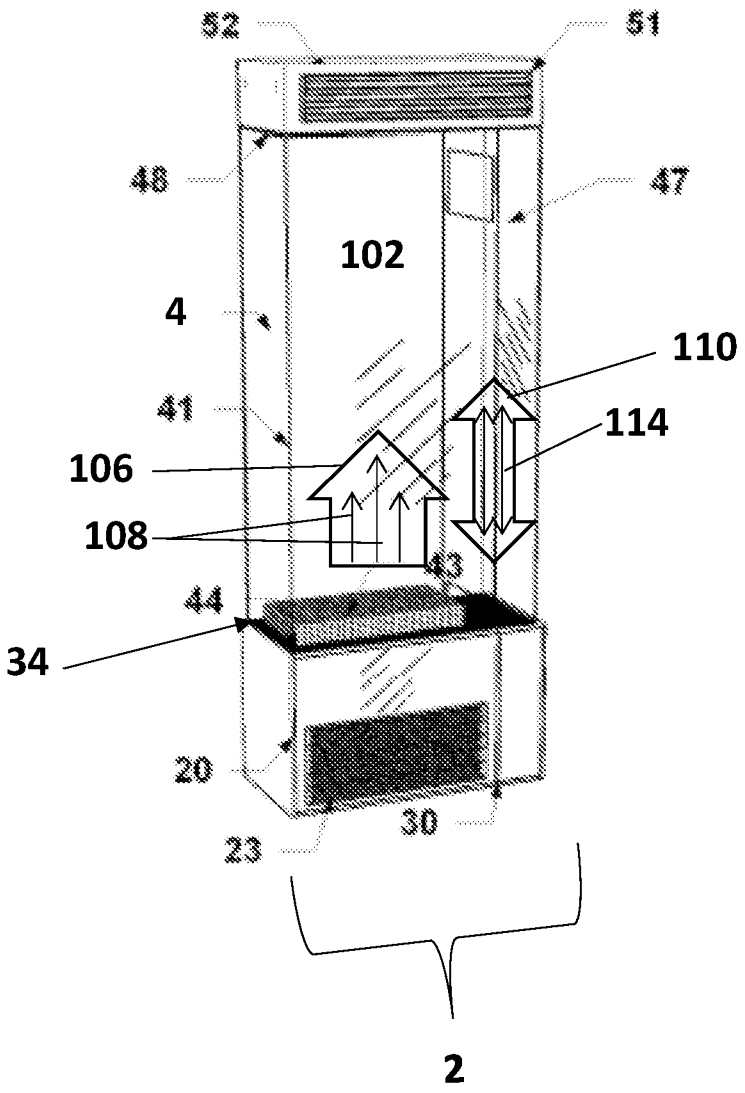
FIG. 8 is an overview drawing of the visual display system without a large fan source and instead using smaller fans as the array sections of the variable flow air array generation system.
Figure 9:
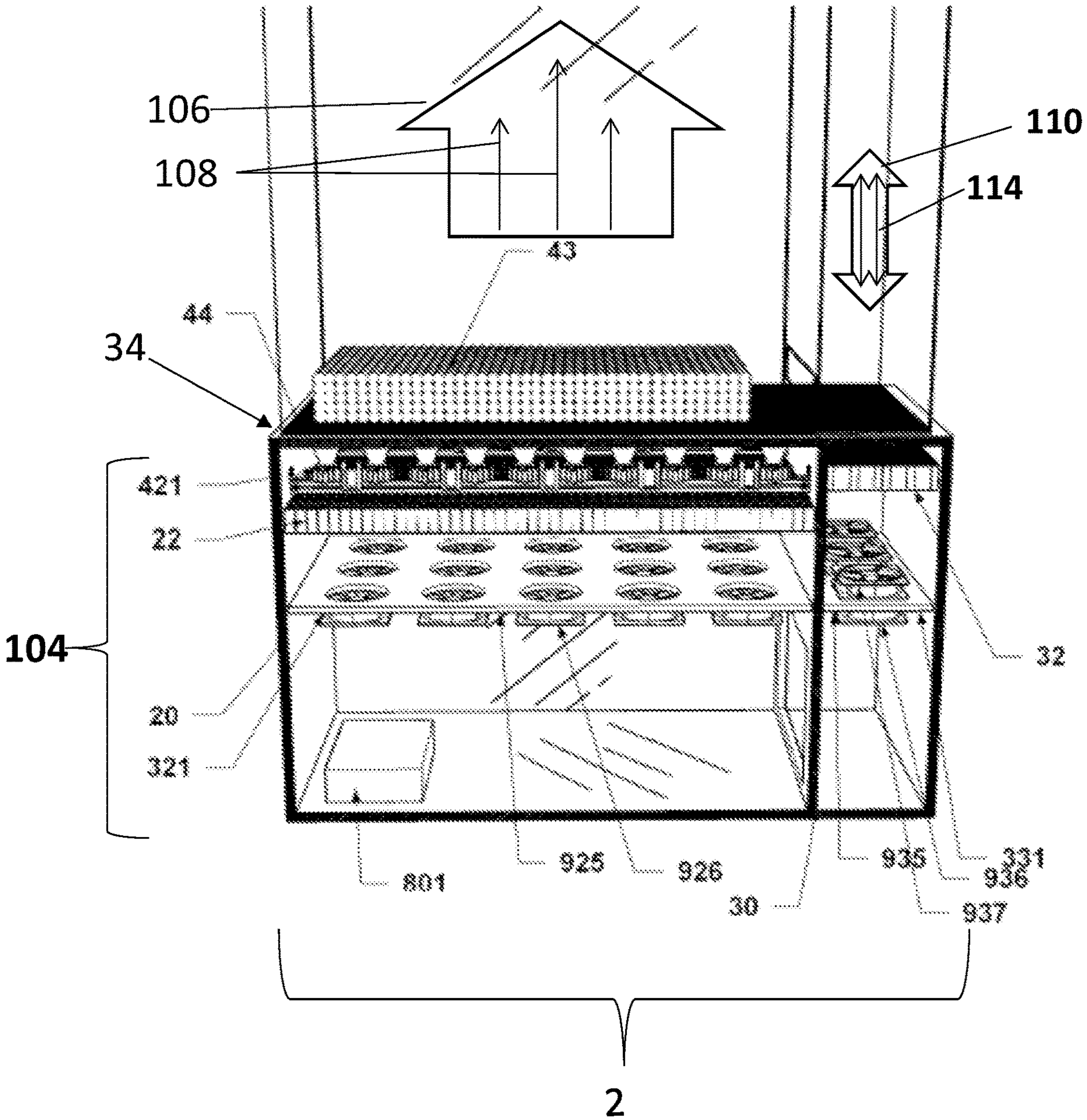
FIG. 9 is a closeup sectional view of the visual display system shown in FIG. 8 showing a grid of smaller fans as the array sections of the variable flow air array generation system for the main column and an array of 2 back-to-back or front-to-front fans in series to create bidirectional fans as the side column's array sections of the variable flow air array generation system.

FIG. 8 and FIG. 9 depict an embodiment where the three or more array sections of variable flow air array generation device 104 comprise a fan system 321. Here the embodiment does not make use of one or more bottom fans 12 or top fans 62. Instead, the fan system 321 consists of three or more individual fans 926 mounted in an array to a mounting plate 925 below the screened opening 44 to form the fan system 321 which is the source of variable flow air array 106 and distinct but coordinated airflows 108 into the chamber 41. Each fan 926 of the fan system 321 pulls in air through the air inlet 23 and discharges distinct but coordinated air flows 108 within the chamber 41 that coalesce with each other into forming the variable flow air array 106. An example of a suitable fan for each fan 926 is a computer cooling fan that can be controlled with a PWM (Pulse Width Modulated) control signal whose pulse width can be varied to change the speed of the motor or analog voltage or digital addressed control via the controller 801. In certain embodiments, one or more of the controllable array fans 926 comprises a variable pitch fan blade. In some embodiments, the controllable array fan system 321 comprises a controllable bidirectional array fan or a bidirectional array fan system comprising two controllable array fans in fluid communication that are directed toward each other or away from each other. Other possible configurations will be apparent for one skilled in the art given the benefit of this disclosure.

In embodiments where the visual display system 100 further includes a bead transport control subsystem, this system can also include additional airflow control device 331 comprising one or more bead transport fans 936, 937 configured to vary at least a volume of the additional airflow. An example of this can be seen in FIG. 9. Fan 936 is configured to direct airflow 110 into the conduit 42 while fan 937 is configured to draw airflow 110 out of the conduit 42. When the additional airflow 110 flows out of the at least one conduit 42 through the screened opening 45 a first subset of the plurality of beads 43 are pulled against the screened opening 45 or are frozen in place near the screened opening 45 such that the first subset of the plurality of beads 43 stops or restricts a flow of a second subset of the plurality of beads 43 through the at least one conduit 42.

Figure 10:
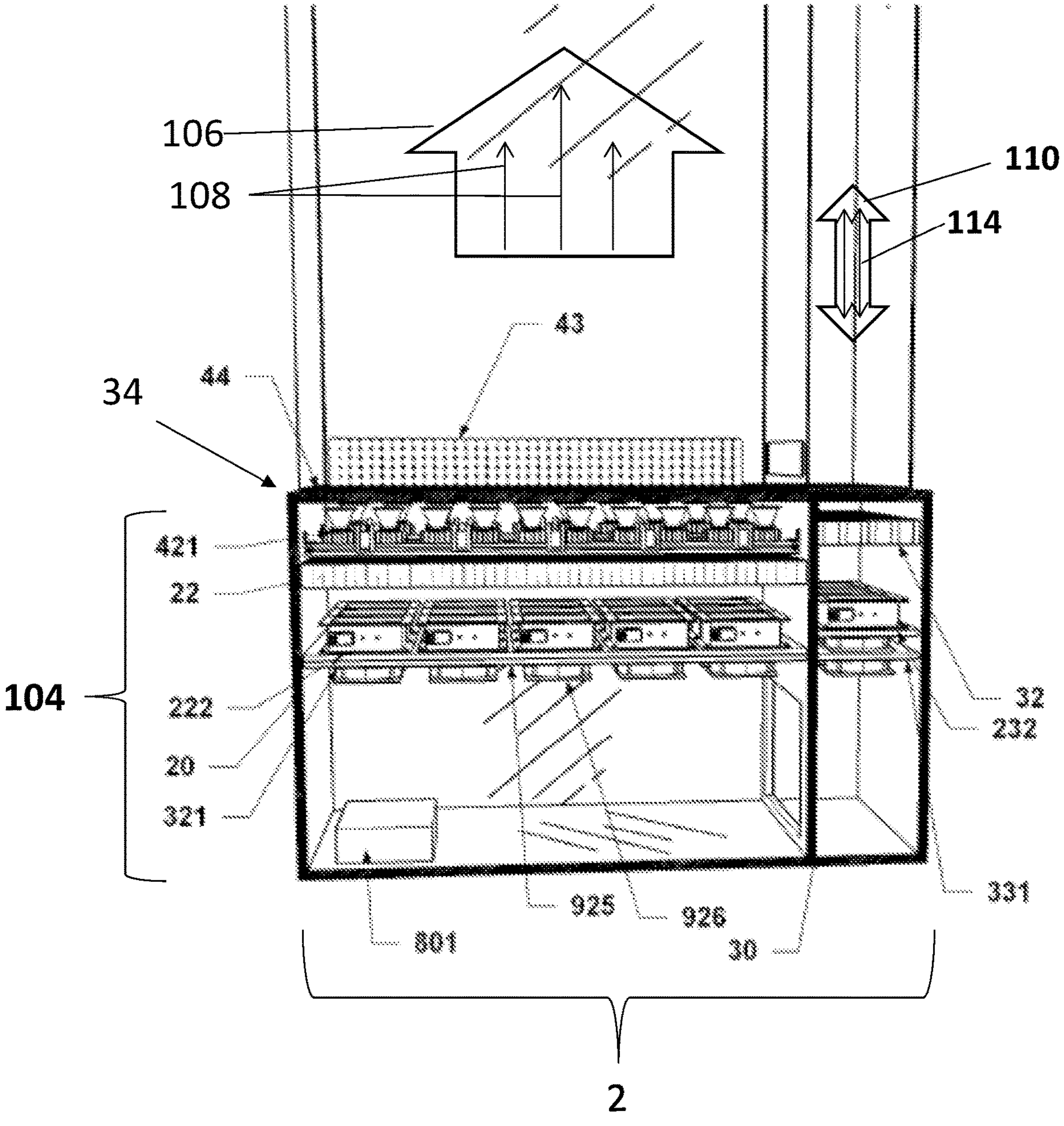
FIG. 10 is a closeup sectional view of the visual display system without a large fan source where the main column array sections of the variable flow air array generation system consisting of a small fan in series with a damper and the side column's array sections of the variable flow air array generation system comprise an array of 2 back-to-back or front-to-front fans and a damper all in series.

FIG. 10 depicts an embodiment where the fan system 321 further comprises a damper system 222 used in conjunction with the fan system 321 so that each fan 926 has a corresponding damper 922 mounted opposite on the mounting plate 925 and in fluid communication with each fan 926. The damper 922 can operate as a backdraft or a fast on/off controllable damper and is controlled by the controller 801 in a manner similar to the embodiment of FIG. 5.

For a wider range of effects, some of the fans 926 may be either turned off or run at very low speed. Under these conditions where some of the fans 926 are operating at higher speeds, the positive pressure generated by the higher speed operating fans can force air back down or in reverse through the fans that are turned off or are operating at much lower speeds. To prevent this leakage or wasteful short-circuiting of airflow back around the higher speed fans, either a gravity-fed or spring-loaded damper 922 in series with the low or zero-speed fans may automatically close or a controllable damper 922 can be commanded closed to prevent this backflow of air or uncontrolled reversal of airflow through the lower speed or turned off fans. In lieu of using these extra backdraft or controllable on/off fans, reverse flow can be prevented in embodiments such as shown in FIG. 9 which have no dampers 922 in series with the fans 926 by ensuring that all the fans 926 are always operating and have at least some minimum speed that is enough at low or zero flow conditions to generate a positive pressure that is approximately equal to the positive pressure of the higher speed fans running at higher flows in order to prevent this backward flow of air through these slower fans.

The other purpose for at least a fast operating on/off damper 922 is to provide a rapid change in the volume of airflow through the chamber 41 or conduit 42. Fans 926 typically have enough inertia in their fan wheels or blades so it can take 5 to 20 seconds or more to accelerate to full or a higher speed or decelerate to zero or a lower speed. A damper 922 with a fast, 0.5 to 5 second damper operator, a fast linear actuator, or a fast linear or rotary solenoid can open or close a damper 922 much faster to increase or decrease the air into the column more quickly than by just using a fan 926 alone. This can be used to enhance various effects.

In embodiments where the visual display system 100 further includes a bead transport control subsystem, this system can also include a damper system 232 used in conjunction with the additional airflow control device 331 comprising one or more bead transport fans 936, 937.

Figure 11:
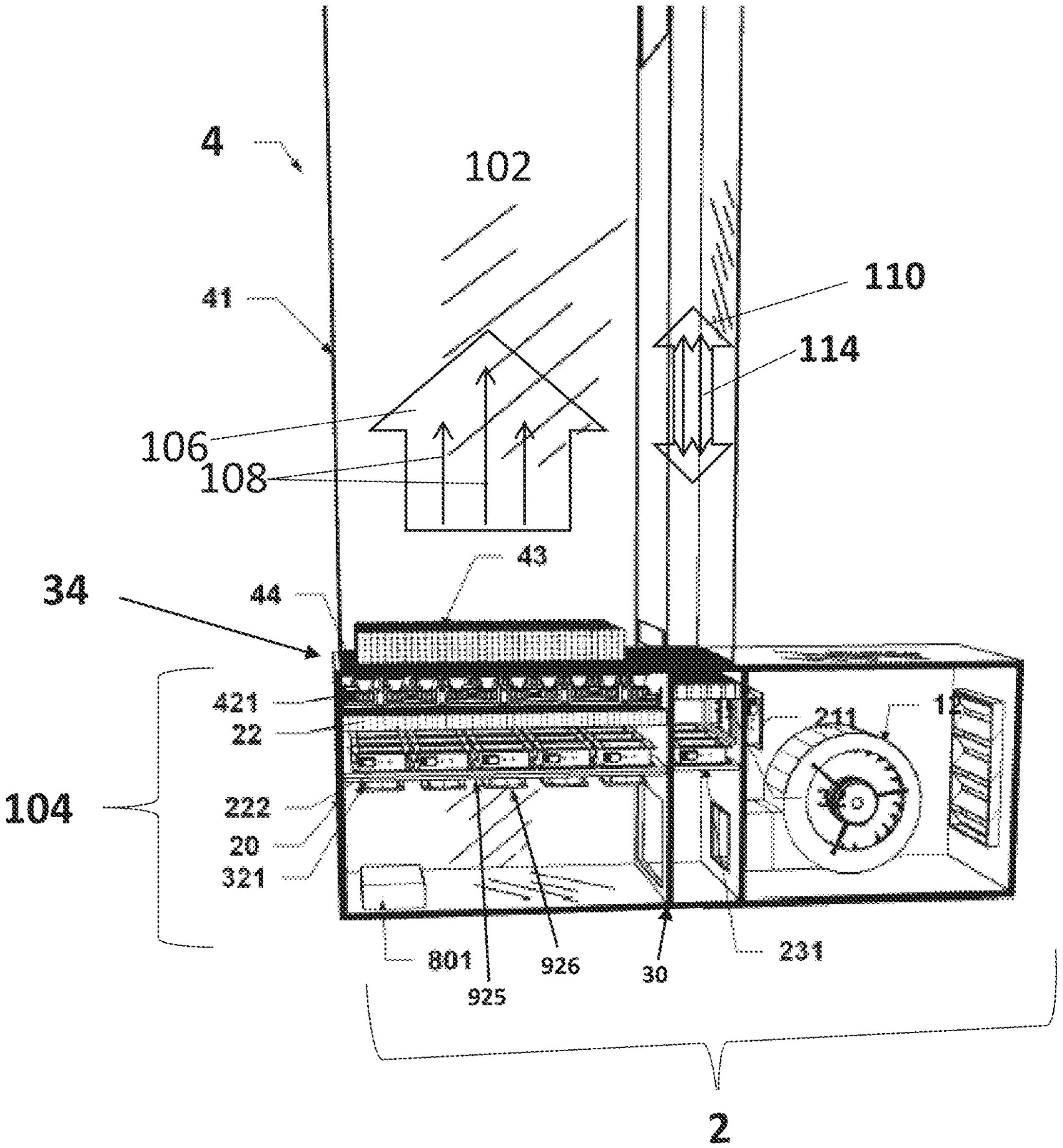
FIG. 11 is a closeup sectional view of the visual display system using a large fan source to provide a source of airflow where the main column array sections of the variable flow air array generation system consists of a small fan in series and the side column's airflow pattern generators consist of two arrays of dampers.

FIG. 11 is the system of FIG. 10 used in further conjunction with a bottom fan 12 as described in regard to FIGS. 2-5. This bottom fan 12 can for example help boost the flow of the fans 926 and also to help prevent backwards flow through those fans operating slowly or have been turned off.

Figure 12:
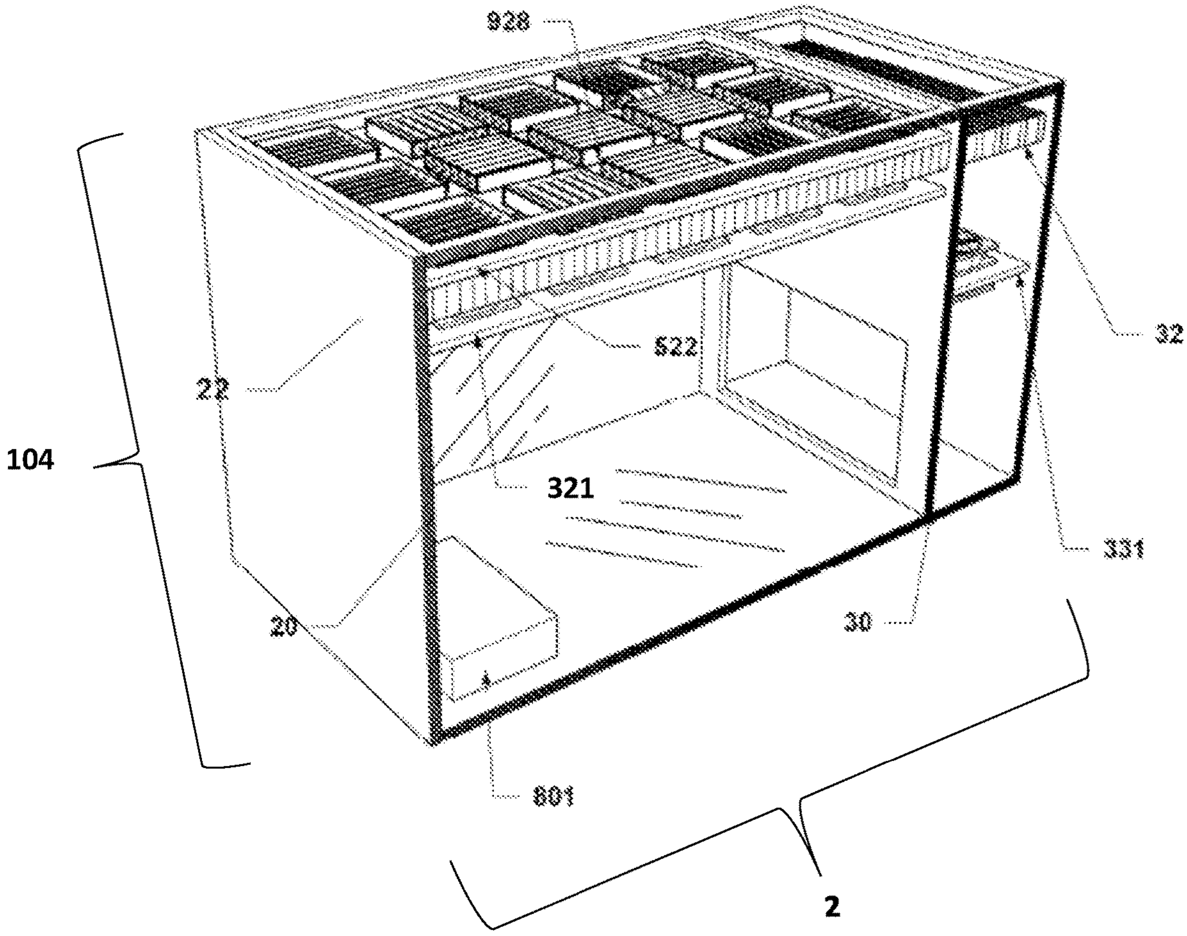
FIG. 12 is a closeup sectional view of the base of the visual display system where the main column variable flow air array generation system consists of a fan in series with an airflow stream angle controller.

FIG. 12. depicts an embodiment of the system 100 wherein the honeycomb filter 22 is disposed between a fan system 321 and an airflow angle controller 522. The airflow angle controller 522 varies at least a portion of the airflow passing through the screened opening 44 of the bottom 34 of the chamber 41 to an angle other than perpendicular to the screened opening 44 of the bottom 34 of the chamber 41. Here the airflow angle controller comprises one or more damper device 928 with controllable blades to vary the angle of the airflow passing through the airflow angle controller 522. Each damper or airflow angle control device 928 can be controlled individually by the controller 801 to either statically set the individual airflow angles or the angle of the airflows can be controlled dynamically to create various effects similar to fountain displays that can vary and sway the angle of the water jet that shoots up into the air in synchronism with music.

Figure 13:
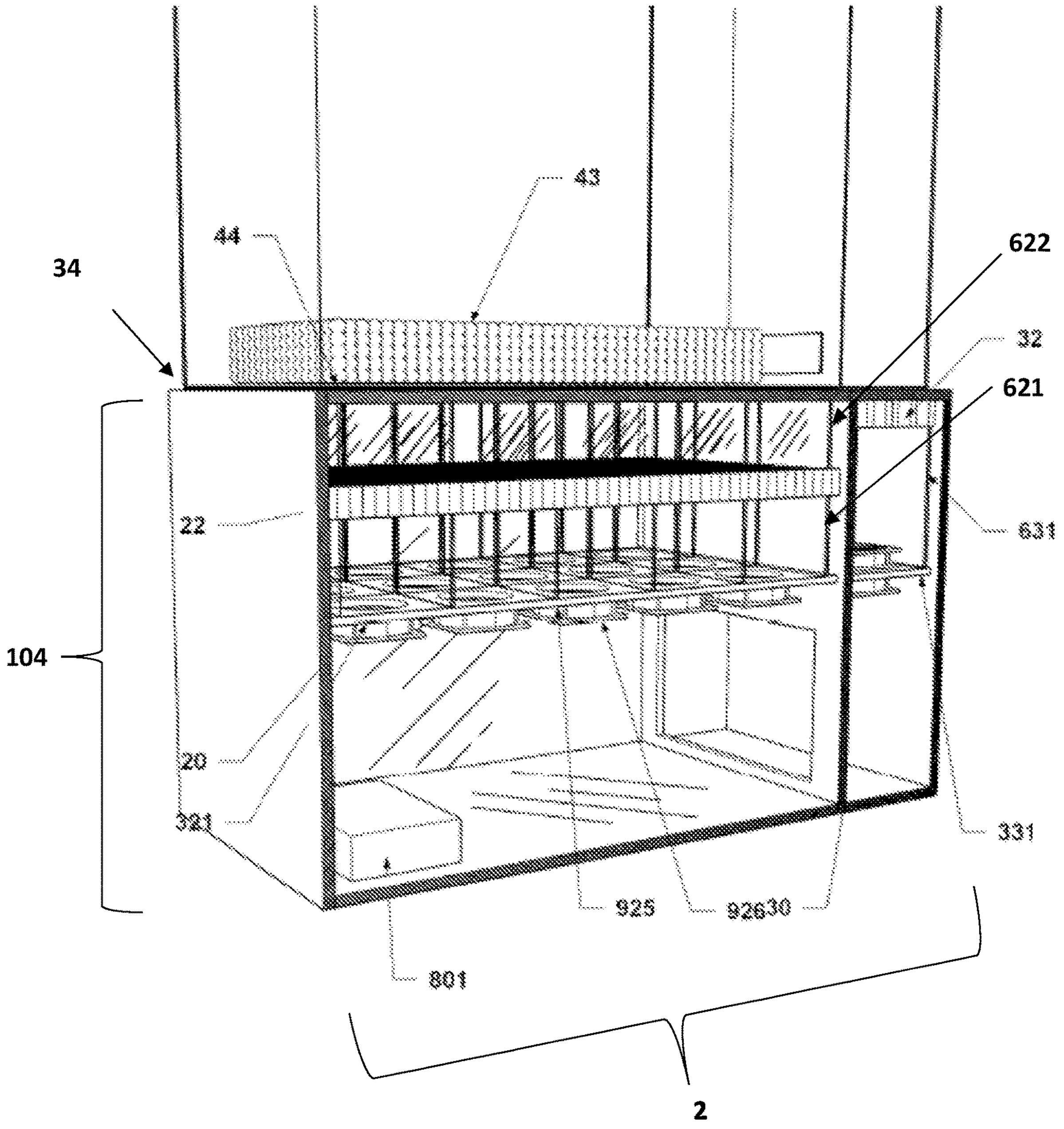
FIG. 13 is a closeup sectional view of the visual display system without a large fan source where the main column variable flow air array generation system consists of a small fan whose exiting airflow is at least partially contained by a tube of some height below the airflow straighteners and a second tube located above the airflow straightener. The side column variable flow air array generation system consists of two back-to-back or front-to-front fans whose airflow entering or leaving the top of the two-fan assembly is at least partially contained in a tube.
Figure 14:
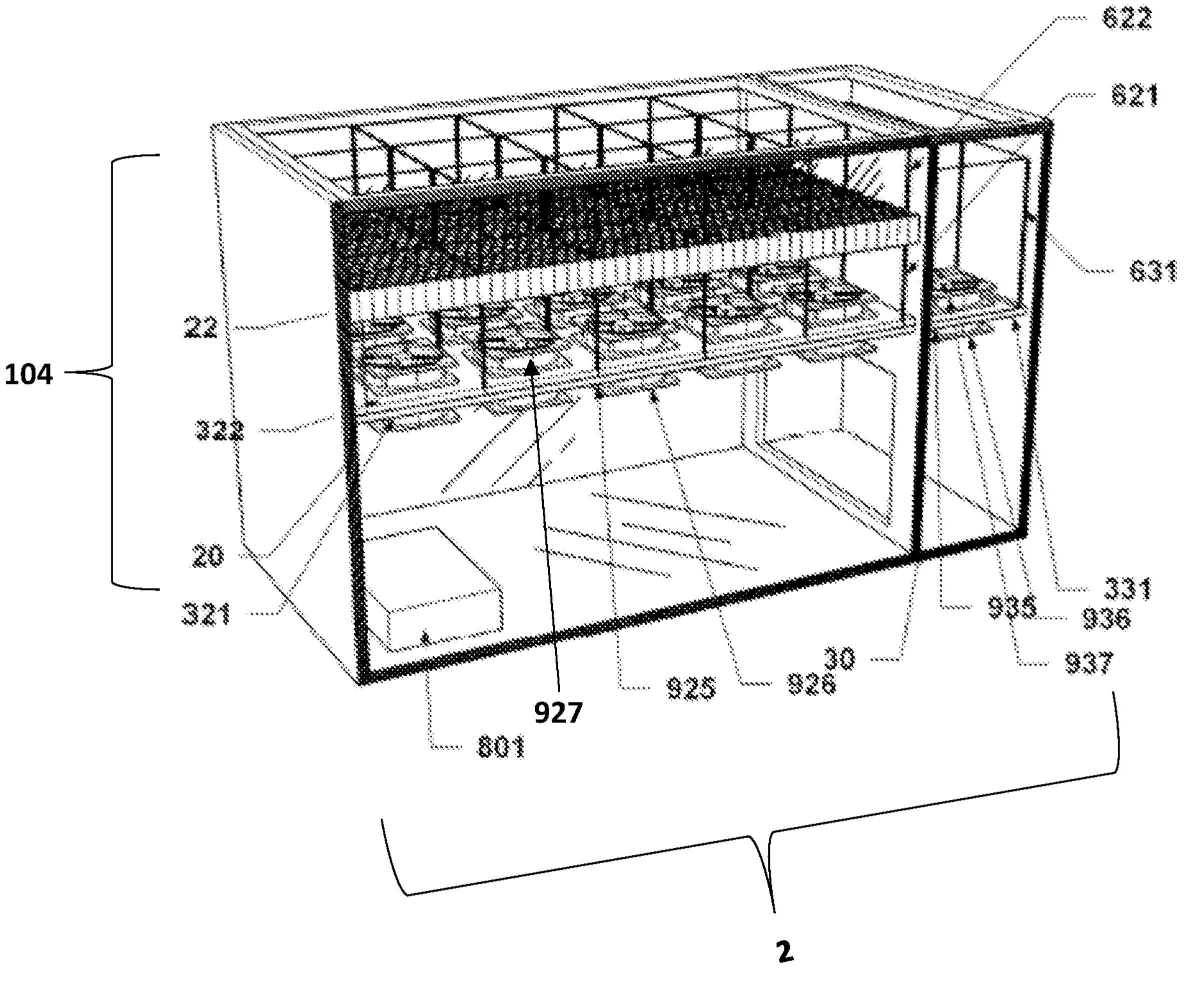
FIG. 14 is a closeup sectional view of just the base of the visual display system shown in FIG. 13.
Figure 15:
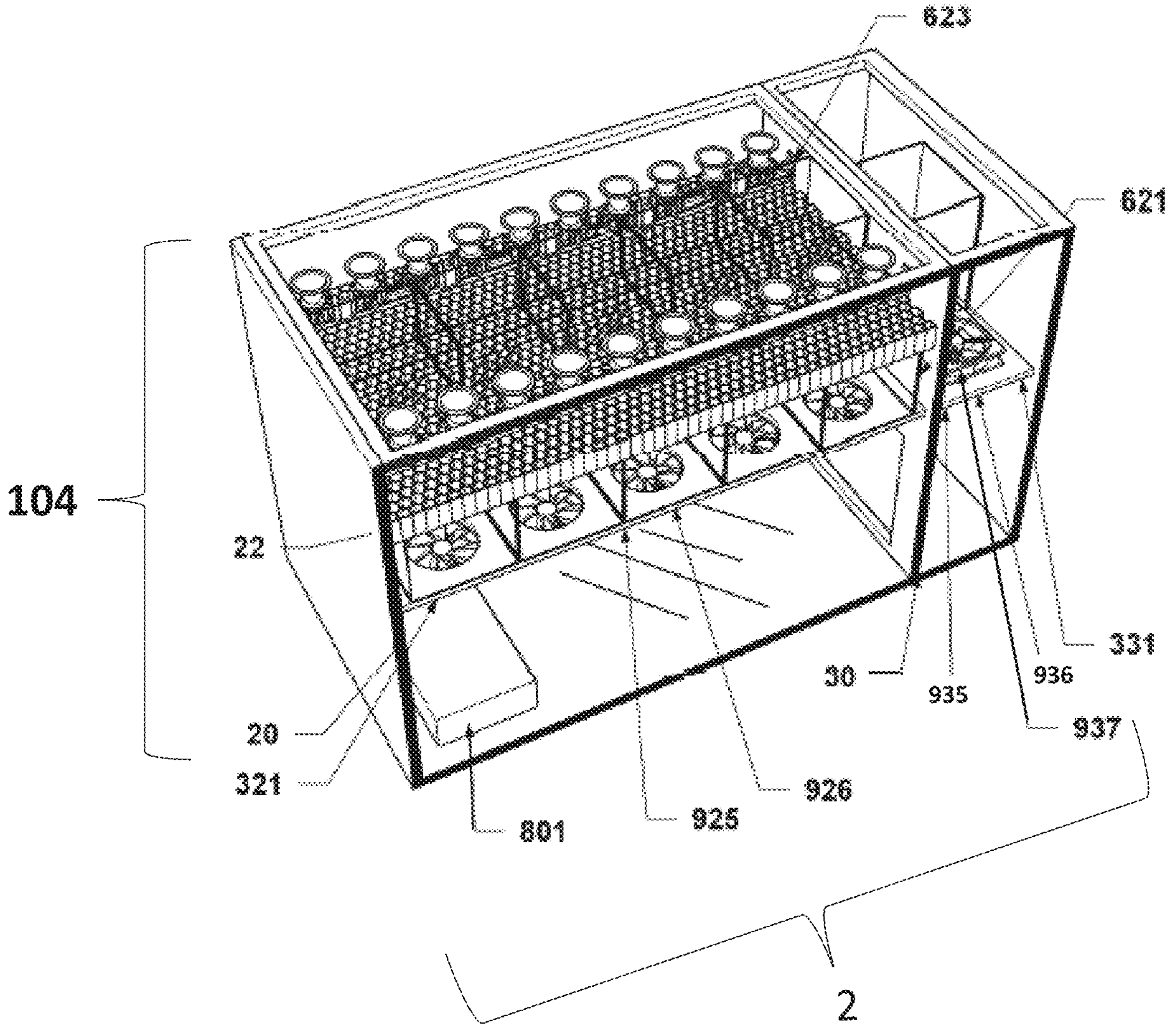
FIG. 15 is a closeup sectional view of just the base of the visual display system without a large fan source where the main column array sections of the variable flow air array generation system consisting of a small fan whose exiting airflow is at least partially contained by a tube of some height below the airflow straighteners. Above the airflow straighteners, there is only a center row of channels to contain the center row of the fan's airflow. The front and back upper channels are omitted to leave room for a front and back light bar with the front and back rows of fan's airflow still partially contained by the upper center row of channels and the front and back sides of the base. The side column array sections of the variable flow air array generation system consist of 2 back-to-back or front-to-front fans where only the center fan's airflow entering or leaving the top of the series fan assembly is at least partially contained in a tube.
Figure 16:
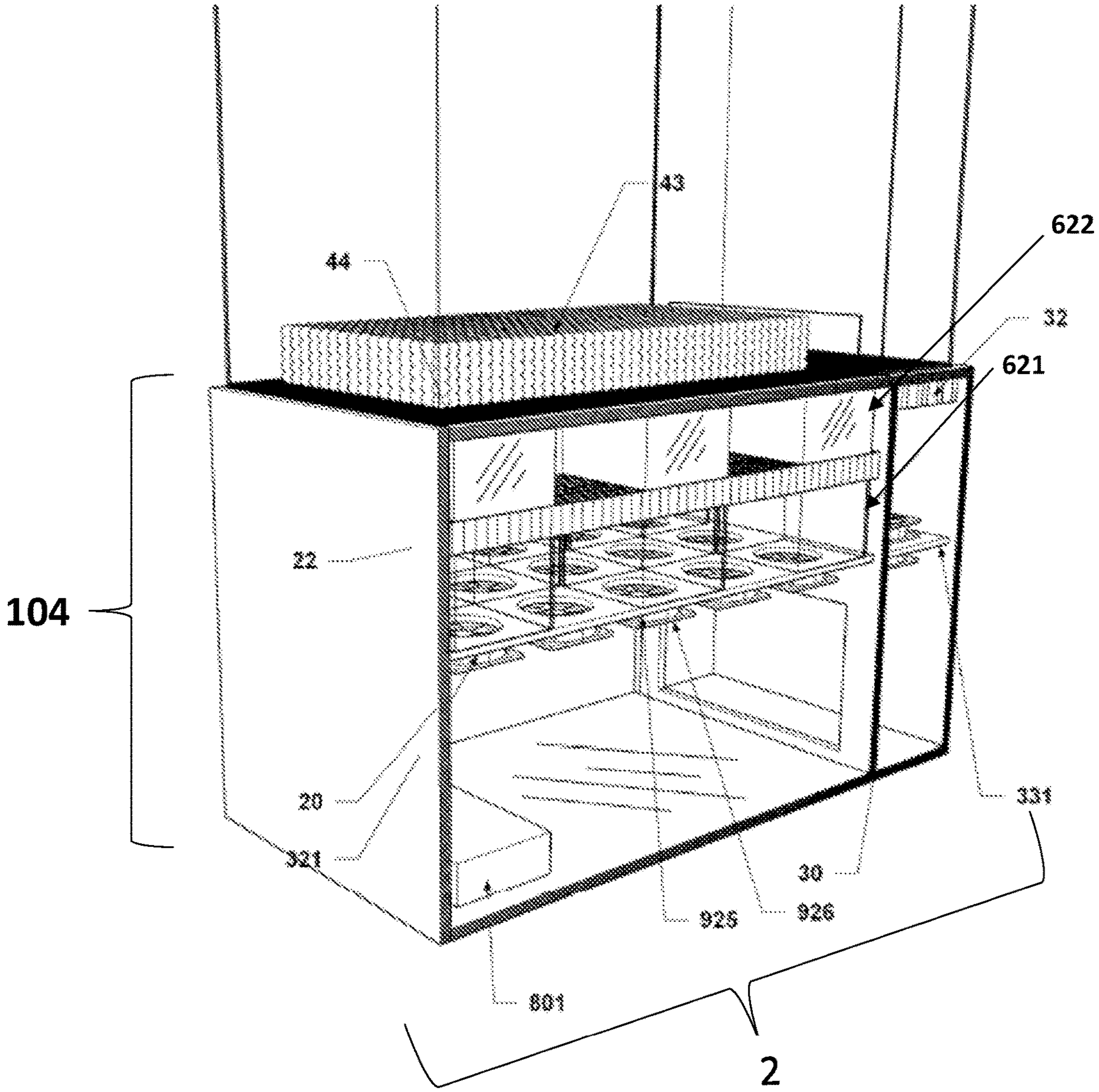
FIG. 16 is a closeup sectional view of the visual display system without a large fan source where the main column array sections of the variable flow air array generation system consisting of a small fan whose exiting airflow is at least partially contained by a tube of some height below the airflow straighteners and a second tube above the airflow straightener. In this embodiment, every other tube is omitted since the walls of the remaining channels will enclose the airflow of the fans without channels over them. Similarly for the array of three side column fans only the center fan's flow needs to be contained in a tube to provide good containment of the front and back fan set's airflows.
Figure 17:
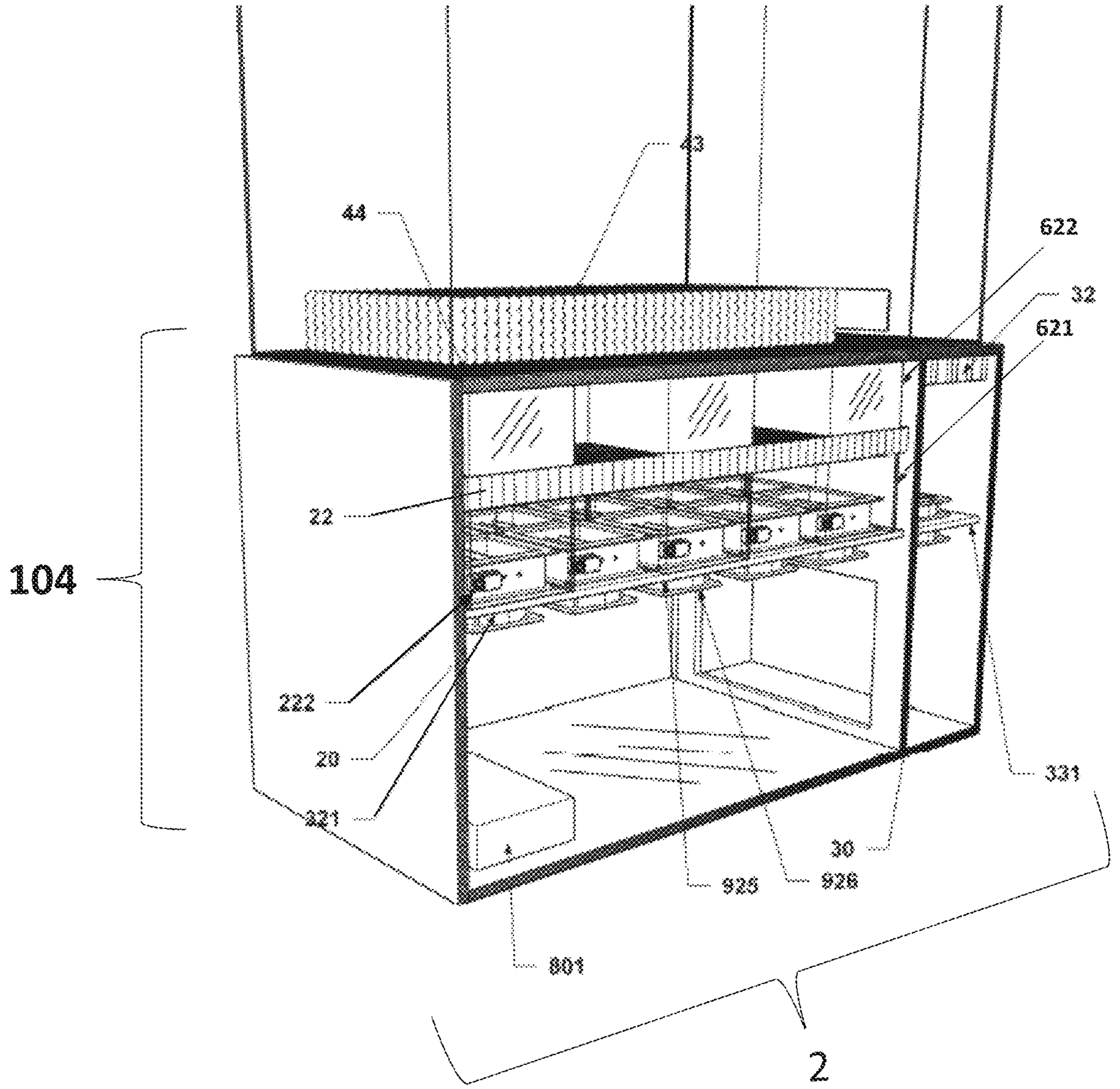
FIG. 17 is a closeup sectional view of the visual display system without a large fan source where the main column array sections of the variable flow air array generation system consisting of a small fan in series with a damper whose exiting airflow is at least partially contained by a tube of some height below the airflow straighteners and a second tube above the airflow straightener. In this embodiment, every other tube is omitted since the walls of the remaining channels will enclose the airflow of the fans without channels over them. Similarly for the array of three side column fans only the center fan's flow needs to be contained in a tube to provide good containment of the front and back fan set's airflows.
Figure 18:
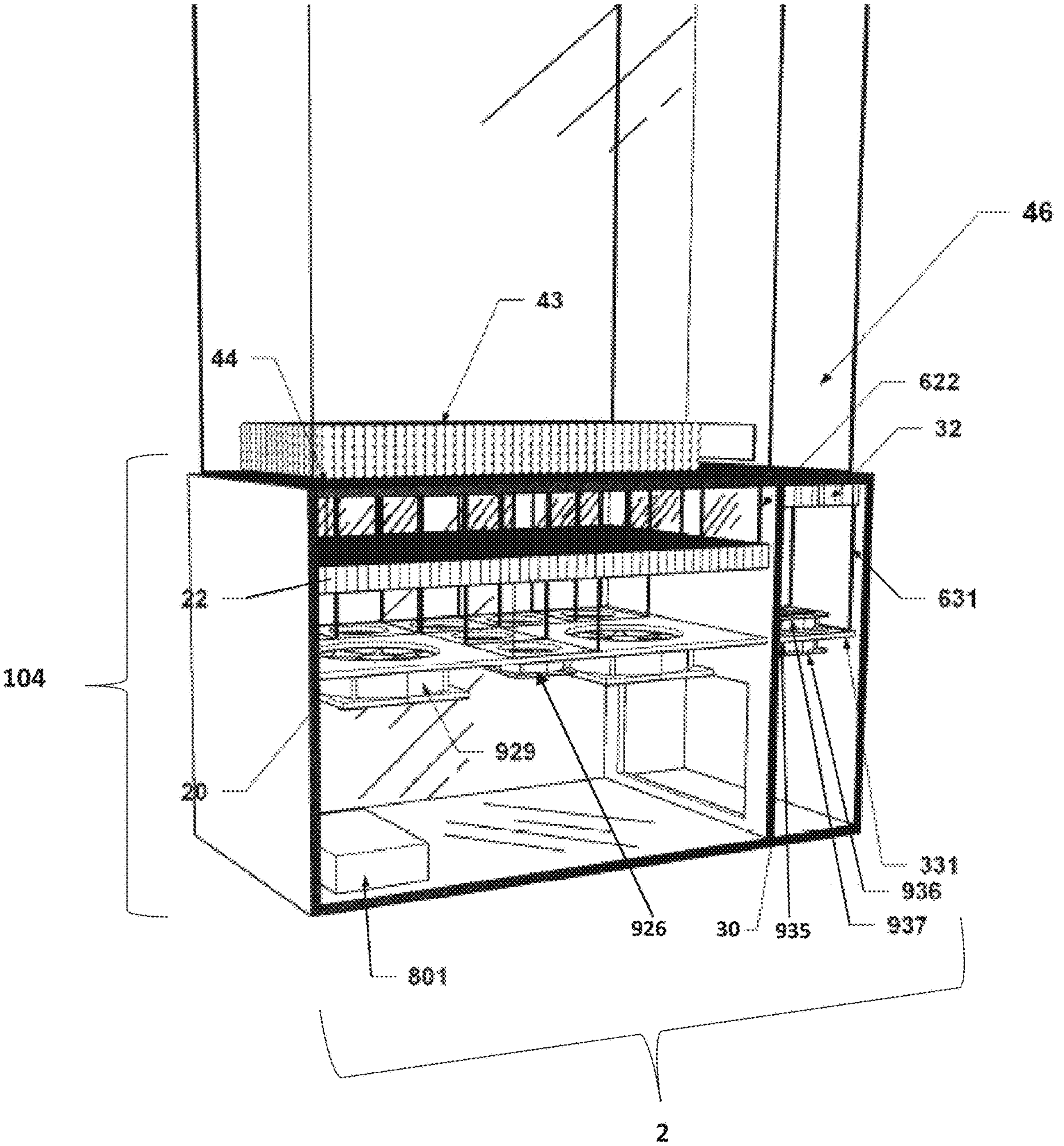
FIG. 18 is a closeup sectional view of the visual display system without a large fan source where the main column airflow variable flow air array generation system consists of different sized fans with tubes over enough of the fans to sufficiently contain the flow of the airflow leaving all of the fans.
Figure 19:
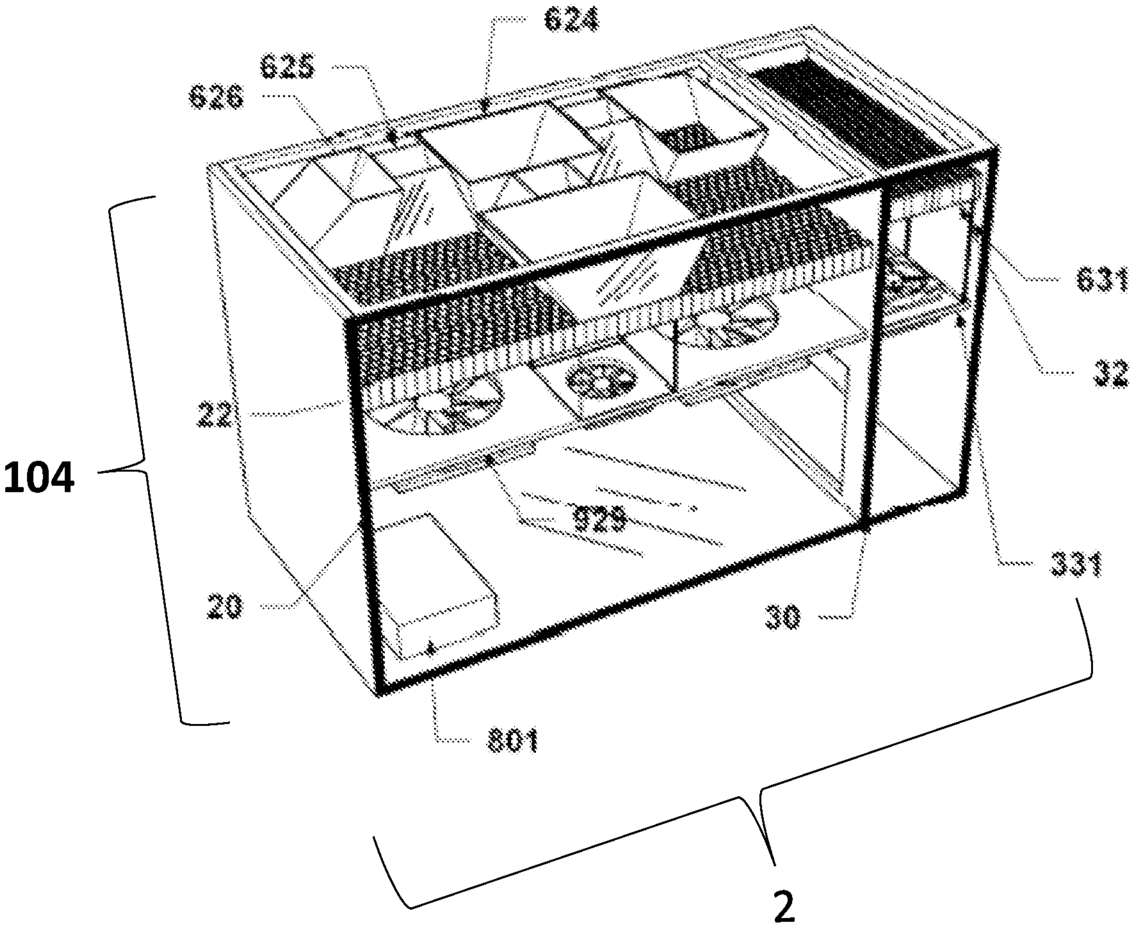
FIG. 19 is a closeup sectional view of the base of the visual display system without a large fan source where the main column variable flow air array generation system consists of different-sized fans with channels over enough of the fans both above and below the airflow straightener to sufficiently contain the flow of the airflow leaving all of the fans. Furthermore, the channels above the airflow straightener have varying-sized top openings so that the velocity of air exiting the channels may be higher or lower than the average velocity of airflow of the air exiting the fans.

In certain embodiments, one or more of the three or more array sections of the variable flow air array generation device 104 further comprises a channel 621, 622 in fluid communication with the array section providing a better definition to the airflow exiting the array section. Examples of these channels 621, 622 can be seen in FIGS. 13-19. In FIG. 13 channels 621 are disposed between a fan system 321, such as seen in FIGS. 8-9, and the honeycomb filter 22 while channels 622 are disposed between the honeycomb filter 22 and the screened portion 44 of the bottom 34. of the chamber 41. In FIG. 14 channels 621 are disposed between a fan system 321 comprising a controllable bidirectional array fan or a bidirectional array fan system comprising two controllable array fans 926, 927 in fluid communication that are directed toward each other or away from each other and the honeycomb filter 22 while channels 622 are disposed between the honeycomb filter 22 and the screened portion 44 of the bottom 34. of the chamber 41. Having channels 621 and 622 used in combination with bidirectional fans helps prevent short-circuiting of airflows within the base assembly 2 containing the fans, particularly when some fans in the variable flow air array generation device 104 are moving air in one direction and other fans in the variable flow air array generation device 104 are simultaneously running airflow in the reverse direction. In FIG. 15 channels 621 are disposed between a fan system 321, such as seen in FIGS. 8-9, and the honeycomb filter 22 while channels 623 are disposed between the honeycomb filter 22 and the screened portion 44 of the bottom 34 of the chamber 41 in a single array along the middle of the screened portion, allowing light sources 421 to be disposed along the front and back edges. In FIG. 16 channels 621 are disposed between a fan system 321, such as seen in FIG. 9, and the honeycomb filter 22 while channels 622 are disposed between the honeycomb filter 22 and the screened portion 44 of the bottom 34 of the chamber 41 in an alternating pattern, which still provides containment of each fan's airflow but without each fan having its own channel 622. In FIG. 17 channels 621 are disposed between a fan system 321 that includes both fans 926 and dampers 922, such as seen in FIG. 10, and the honeycomb filter 22, while channels 622 are disposed between the honeycomb filter 22 and the screened portion 44 of the bottom 34 of the chamber 41 in an intermittent pattern. In FIG. 18 channels 621 are disposed between a fan system 321, having fans 926, 929 of different sizes and/or configurations to match what is needed for different degrees of control and resolution of the airflow potentially using less fan or damper elements or ones that better fit the geometry of the desired variable flow air array 106, and the honeycomb filter 22 while channels 622 are disposed between the honeycomb filter 22 and the screened portion 44 of the bottom 34 of the chamber 41. In FIG. 19 channels 621 are disposed between a fan system 321, having fans 926, 929 of different sizes and/or configurations, and the honeycomb filter 22 while channels 624, 625, and 626 are disposed between the honeycomb filter 22 and the screened portion 44 of the bottom 34 of the chamber 41. Channels 624 are configured to decrease the velocity of airflow passing through the channels 624. Channels 625 and 626 are configured to increase the velocity of airflow passing through the channels 625 and 626. Channels 626 are further configured to redirect the airflow passing through the channels 626.

In visual display systems 100 further including a bead transport control subsystem, the system 100 can also include channels 631 configured in a similar fashion as channels 621 and 622.

In certain embodiments, at least a portion of one of the channels 621, and 622 is lined with sound dampening material as would be readily understood by those of ordinary skill in the art to help reduce the level of noise from the fans that is heard outside the visual display device.

Figure 20:
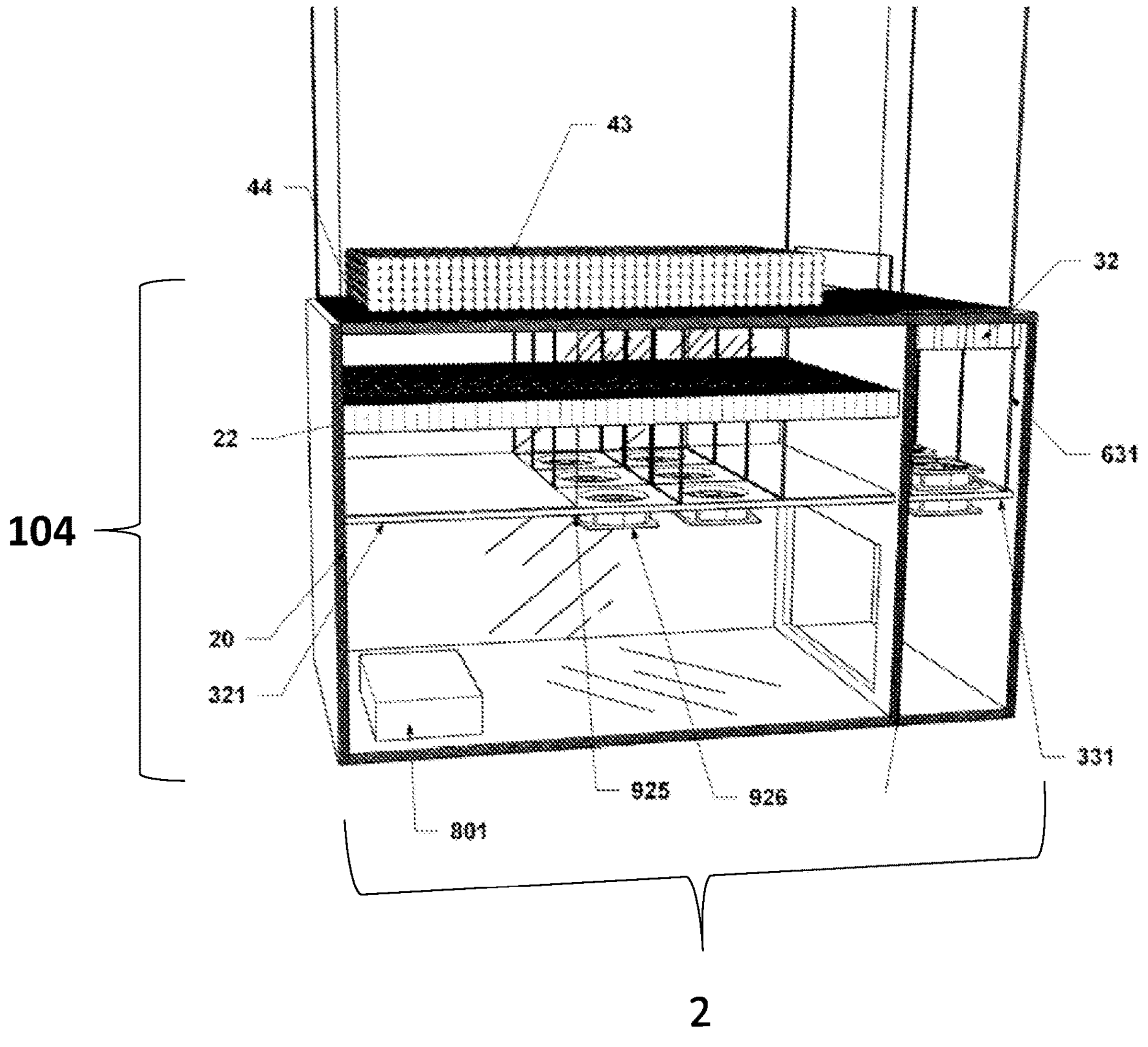
FIG. 20 is a closeup sectional view of the base of the visual display system without a large fan source where the main column variable flow air array generation system consists of a series of six fans in a two-by-three array configuration.
Figure 21:
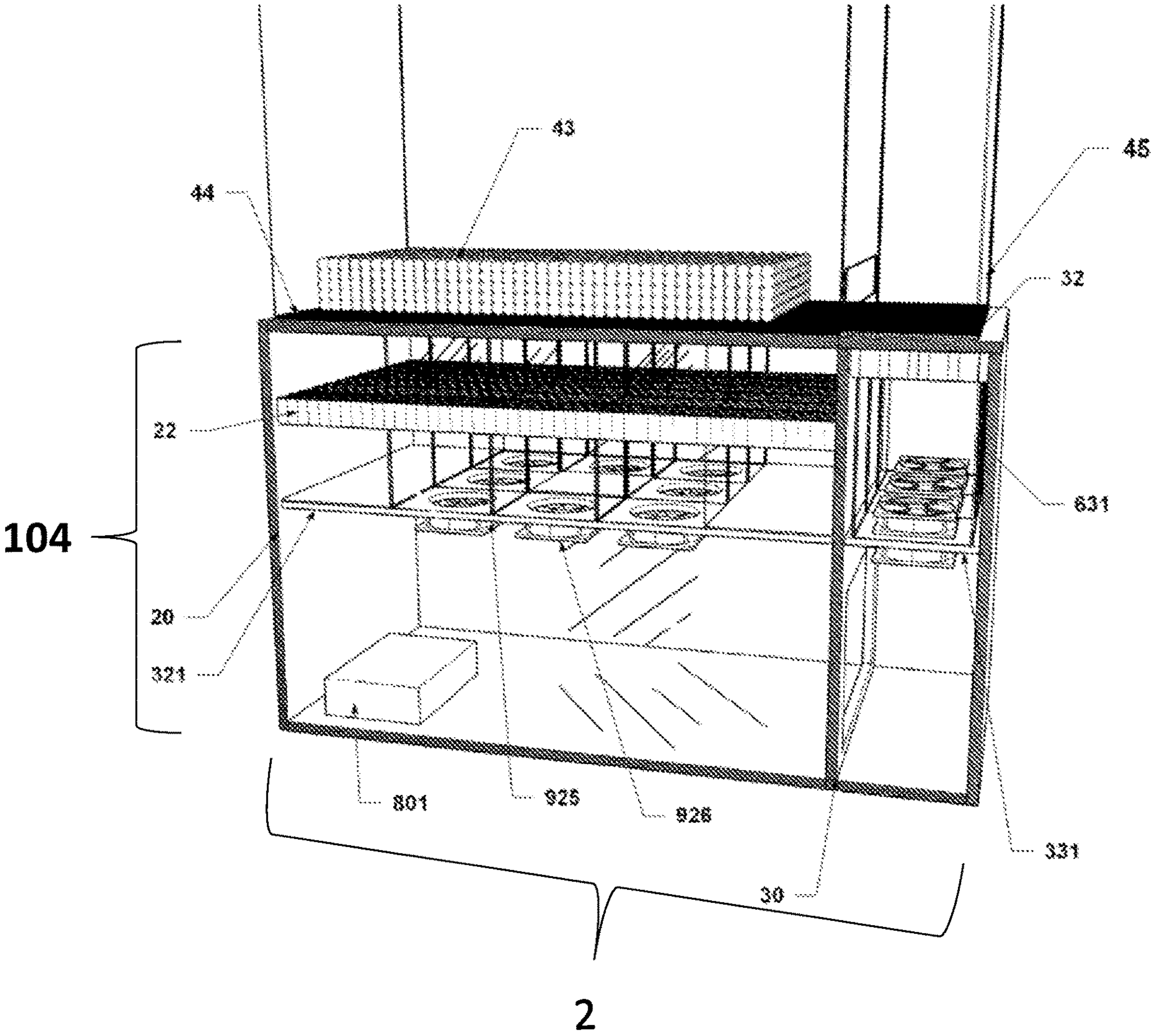
FIG. 21 is a closeup sectional view of the base of the visual display system without a large fan source where the main column variable flow air array generation system consists of a series of eight fans in a ring configuration.

FIG. 20 and FIG. 21 depict alternate configurations of the three or more array sections of the variable flow air array generation device 104. In FIG. 20 the variable flow air array generation device 104 has a series of six fans 926 in a two-by-three (2×3) array configuration that comprises 40% of a total area of the bottom 34 having the screened opening 44 therethrough. In FIG. 21 variable flow air array generation device 104 has a series of eight fans 929 in a ring configuration that comprises 53% of a total area of the bottom 34 having the screened opening 44 therethrough.

It should be understood that the examples and embodiments depicted herein can be modified and combined in any number of combinations. For example, one or more of the three or more array sections of the variable flow air array generation device 104 can have a different size or configuration from the other array sections of the variable flow air array generation device. Other possible configurations and implementations will be apparent to one skilled in the art given the benefit of this disclosure.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A visual display system for creating various visual and audible effects with a plurality of beads, the visual display system comprising:

a chamber comprising:

a bottom having a screened opening therethrough;

a top opposite the bottom; and at least one sidewall extending between the bottom and the top and defining an interior volume, the at least one sidewall having an observation portion providing an internal view of the chamber from an environment external to the chamber;

the plurality of beads disposed within the interior volume of the chamber; and a variable flow air array generation device that facilitates a variable flow air array, the device in fluid communication with the screened opening in the bottom of the chamber, and the device comprising:

three or more array sections each contributing distinct but coordinated air flows within the chamber that coalesce with each other into forming the variable flow air array, the three or more array sections having a total combined area that is a substantial portion of a total area of the bottom having the screened opening therethrough; and a controller in electronic communication with and controlling each of the three or more array sections of the device providing each of the distinct but coordinated air flows;

wherein the variable flow air array generated by the device agitates, fluidizes, suspends, or floats at least some of the plurality of beads creating a dynamic display of beads within the chamber.

2. The visual display system of claim 1, wherein the three or more array sections have a total combined area that is at least 40% of a total area of the bottom having the screened opening therethrough.

3. The visual display system of claim 1, wherein the observation portion of the at least one sidewall comprises a substantially transparent or substantially translucent material.

4. The visual display system of claim 1, wherein the controller of the variable flow air array generation device comprises an analog controller, a processor, or a microcontroller.

5. The visual display system of claim 1, wherein the controller of the variable flow air array generation device provides variable signals to each of the three or more array sections individually.

6. The visual display system of claim 1, wherein three or more array sections of the variable flow air array generation device are substantially contiguous.

7. The visual display system of claim 1, wherein the three or more array sections of the variable flow air array generation device are arranged in a grid, one-dimensional array, multiple spaced one-dimensional arrays, or ring-shaped configuration.

8. The visual display system of claim 1, wherein one or more of the three or more array sections of the variable flow air array generation device has a different size or configuration from other array sections of the variable flow air array generation device.

9. The visual display system of claim 1, wherein the top of the chamber comprises a screened opening and one or more controllable top fans are disposed at the top of the chamber configured to draw airflow through the interior volume of the chamber and out through a screened opening of the top.

10. The visual display system of claim 1, further comprising one or more controllable bottom fans in fluid communication with the chamber and providing sources of airflow within the chamber.

11. The visual display system of claim 10, wherein the three or more array sections of the variable flow air array generation device are disposed between the one or more controllable bottom fans and the screened opening of the bottom of the chamber.

12. The visual display system of claim 1, wherein one or more of the three or more array sections of the variable flow air array generation device comprises a controllable damper system.

13. The visual display system of claim 12, wherein the controllable damper system comprises two controllable dampers in fluid communication.

14. The visual display system of claim 1, wherein the three or more array sections of the variable flow air array generation device comprise a controllable array fan system.

15. The visual display system of claim 14, wherein the controllable array fan system comprises a controllable array fan in fluid communication with a backdraft or a controllable damper.

16. The visual display system of claim 14, wherein the controllable array fan system comprises a controllable bidirectional array fan or a bidirectional array fan system comprising two controllable array fans in fluid communication that are directed toward each other or away from each other.

17. The visual display system of claim 14, wherein the controllable array fan system comprises a variable pitch fan blade.

18. The visual display system of claim 1, wherein one or more of the three or more array sections of the variable flow air array generation device further comprises an airflow angle controller, wherein the airflow angle controller varies at least a portion of the airflow passing through the screened opening of the bottom of the chamber to an angle other than perpendicular to the screened opening of the bottom of the chamber.

19. The visual display system of claim 18, wherein one or more of the airflow angle controllers comprises a damper device with controllable blades to vary the angle of the airflow passing through the airflow angle controller.

20. The visual display system of claim 1, further comprising a honeycomb airflow straightener or fine mesh screen disposed between and in fluid communication with the screened opening of the bottom of the chamber and one or more of the three or more array sections of the variable flow air array generation device.

21. The visual display system of claim 1, wherein one or more of the three or more array sections of the variable flow air array generation device further comprises a channel in fluid communication with the array section providing definition to airflow exiting the array section.

22. The visual display system of claim 21, wherein at least one of the channels is shaped and configured to increase a velocity of airflow passing through the channel.

23. The visual display system of claim 21, wherein at least one of the channels is shaped and configured to decrease a velocity of airflow passing through the channel.

24. The visual display system of claim 21, wherein at least a portion of one of the channels is lined with sound dampening material.

25. The visual display system of claim 1, further comprising one or more light sources.

26. The visual display system of claim 25, wherein at least one of the one or more light sources is disposed between the screened opening of the bottom of the chamber and the one or more of the three or more array sections of the variable flow air array generation device.

27. The visual display system of claim 26, wherein at least one of the one or more light sources is disposed in at least one of the three or more array sections.

28. The visual display system of claim 1, wherein the plurality of beads comprise lightweight expanded polystyrene plastic beads.

29. The visual display system of claim 1, further comprising a bead transport control subsystem comprising:

at least one conduit connecting a first region of the chamber with a second region of the chamber and having a screened opening disposed in a wall or end or end of the conduit;

wherein at least a portion of the plurality of beads are controlled by an additional airflow passing through the at least one conduit via the screened opening; and wherein the additional airflow is controlled at least partially independently from the variable flow air array.

30. The visual display system of claim 29, wherein the bead transport control subsystem further comprises one or more bead transport fans configured to vary at least a volume of the additional airflow.

31. The visual display system of claim 29, wherein the bead transport control subsystem further comprises one or more dampers configured to vary at least a volume of the additional airflow.

32. The visual display system of claim 29, wherein the bead transport control subsystem further comprises:

an additional airflow control device configured to control at least a volume of the additional airflow, wherein the additional airflow flows out of the at least one conduit through the screened opening wherein a first subset of the plurality of beads are pulled against the screened opening or are frozen in place near the screened opening such that the first subset of the plurality of beads stops or restricts a flow of a second subset of the plurality of beads through the at least one conduit.

33. The visual display system of claim 29, wherein the bead transport control subsystem further comprises:

an additional airflow control device configured to control at least a volume of the additional airflow, wherein the additional airflow flows into the at least one conduit through the screened opening;

wherein the additional airflow is configured to fluidize or cause the plurality of beads to move through the at least one conduit.

34. The visual display system of claim 29, wherein the bead transport control subsystem further comprises:

an airflow control device configured to control the additional airflow into or out of the at least one conduit through the screened opening, wherein the airflow control device comprises:

a first damper having a first end connected to an at least partially enclosed space and also connected to one or more bottom fans wherein a second end of the first damper is configured to blow at least a portion of outlet airflow of the one or more bottom fans into the at least one conduit through the screened opening as the additional airflow; and a second damper having a first end connected to a second at least partially enclosed space and also connected to an inlet of the one or more bottom fan wherein a second end of the second damper is configured to pull the additional airflow out of the at least one conduit through the screened opening into the inlet of the one or more bottom fan.

35. The visual display system of claim 34, wherein the bead transport control system further comprises a second variable flow air array generation device that facilitates a variable flow air array, the second variable flow air array generation device in fluid communication with the screened opening in the conduit, comprising:

multiple array sections contributing distinct but coordinated air flows within the conduit that coalesce with each other into a variable flow air array.

* * * * *